(12) United States Patent
Tsuchiya

(10) Patent No.: US 10,972,665 B2
(45) Date of Patent: Apr. 6, 2021

(54) IMAGING APPARATUS AND IMAGE BLURRING AMOUNT CALCULATION METHOD THEREFOR

(71) Applicant: OLYMPUS CORPORATION, Hachioji (JP)

(72) Inventor: Hitoshi Tsuchiya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 14 days.

(21) Appl. No.: 16/514,461

(22) Filed: Jul. 17, 2019

(65) Prior Publication Data
US 2019/0342498 A1 Nov. 7, 2019

Related U.S. Application Data

(63) Continuation of application No. PCT/JP2017/040122, filed on Nov. 7, 2017.

(30) Foreign Application Priority Data

Jan. 26, 2017 (JP) .............................. JP2017-012554

(51) Int. Cl.
*H04N 5/232* (2006.01)
*G03B 17/14* (2021.01)

(52) U.S. Cl.
CPC ......... *H04N 5/23258* (2013.01); *G03B 17/14* (2013.01); *H04N 5/23209* (2013.01)

(58) Field of Classification Search
CPC . H04N 5/23258; H04N 5/23209; G03B 17/14
See application file for complete search history.

(56) References Cited

U.S. PATENT DOCUMENTS 6,930,708 B1 8/2005 Sato
2005/0168587 A1 8/2005 Sato
(Continued)

FOREIGN PATENT DOCUMENTS

CN 1806202 A 7/2006
JP 2000227613 A 8/2000
(Continued)

OTHER PUBLICATIONS

English translation of International Search Report issued in corresponding International Patent Appln. No. PCT/JP2017/040122 dated Feb. 13, 2018, consisting of 2 pp.
(Continued)

*Primary Examiner* — Twyler L Haskins
*Assistant Examiner* — Fayez A Bhuiyan
(74) *Attorney, Agent, or Firm* — Volpe Koenig

(57) ABSTRACT

An imaging apparatus includes a processor and two acceleration sensors located at different positions on a first plane orthogonal to the optical axis of an image shooting optical system. The processor calculates a first-direction acceleration estimated value for a first position on the optical axis on the basis of the distances in a second direction between the optical axis and the individual acceleration sensors and first-direction acceleration detected values provided by the individual acceleration sensors, calculates a second-direction acceleration estimated value for the first position on the basis of the distances in a first direction between the optical axis and the individual acceleration sensors and second-direction acceleration detected values provided by the individual acceleration sensors, and calculates a first-direction image blurring amount and a second-direction image blurring amount for the imaging apparatus by using the first-direction acceleration estimated value and the second-direction acceleration estimated value.

9 Claims, 26 Drawing Sheets

(56) References Cited

U.S. PATENT DOCUMENTS

2006/0098967 A1 5/2006 Togawa
2012/0038783 A1 2/2012 Noto
2016/0330378 A1* 11/2016 Tsuchiya ............ H04N 5/23258

FOREIGN PATENT DOCUMENTS

| JP | 2004295027 A | 10/2004 |
| --- | --- | --- |
| JP | 2005003719 A | 1/2005 |
| JP | 2010286651 A | 12/2010 |
| JP | 2011039436 A | 2/2011 |

OTHER PUBLICATIONS

Written Opinion issued in corresponding International Patent Appln. No. PCT/JP2017/040122 dated Feb. 13, 2018, consisting of 5 pp. (partial English translation provided).

Office Action issued in corresponding Chinese Patent Application No. 201780083264.X dated Nov. 11, 2020, consisting of 14 pp. (English Translation Provided).

* cited by examiner

|  | MSB | | LSB |
|---|---|---|---|
|  | 16 | | 0 |
| FIRST WORD | YAW ANGULAR VELOCITY | | |
| SECOND WORD | PITCH ANGULAR VELOCITY | | |
| THIRD WORD | ROLL ANGULAR VELOCITY | | |
| FOURTH WORD | X ACCELERATION ESTIMATED VALUE | | |
| FIFTH WORD | Y ACCELERATION ESTIMATED VALUE | | |

F I G. 2 0

IMAGING APPARATUS AND IMAGE BLURRING AMOUNT CALCULATION METHOD THEREFOR

CROSS-REFERENCE TO RELATED APPLICATIONS

This application is based upon and claims the benefit of priority of the prior Japanese Patent Application No. 2017-012554, filed Jan. 26, 2017, the entire contents of which are incorporated herein by reference.

This is a Continuation Application of PCT Application No. PCT/JP2017/040122, filed Nov. 7, 2017, which was not published under PCT Article 21(2) in English.

FIELD

The embodiments discussed herein are related to an imaging apparatus provided with a function for correcting image blurring and an image blurring amount calculation method therefor.

BACKGROUND

With the recent development of shake correction functions for a digital camera (hereinafter simply referred to a "camera"), blurring (image blurring) that occurs in a shot image due to rotational motions of the camera, i.e., what is called angular blurring, can be accurately corrected.

In the case of macro photography for capturing a large image of a subject, however, due to the large influence of blurring (image blurring) caused by translation of a camera, i.e., what is called shift blurring (parallel blurring, translational blurring), simply correcting angular blurring could be insufficient, and the image quality could be decreased due to camera shakes.

Accordingly, a blurring correction apparatus has been proposed, the blurring correction apparatus comprising: an acceleration sensor that detects the acceleration of shakes of an interchangeable lens; an angular velocity sensor that detects the angular velocity of the shakes; and a target-position conversion unit that calculates the center of rotation of the angular blurring on the basis of results of detection of the acceleration and the angular velocity provided by the acceleration sensor and the angular velocity sensor and calculates a target position for a blurring correction lens, wherein the image blurring is corrected by driving the blurring correction lens on the basis of the calculation results provided by the target-position conversion unit (see, for example, Japanese Laid-open Patent Publication No. 2004-295027).

SUMMARY

An aspect of embodiments provides an imaging apparatus provided with an image shooting optical system for forming an image of a subject, the imaging apparatus including a first acceleration sensor, a second acceleration sensor, and a first microprocessor. The first and second acceleration sensors are located at different positions on a first plane orthogonal to the optical axis of the image shooting optical system. The first acceleration sensor detects accelerations for first and second directions. The second acceleration sensor detects accelerations for the first and second directions. The first microprocessor includes a first acceleration estimation section, a second acceleration estimation section, and a blurring amount calculation section, and these sections perform arithmetic processing. The first acceleration estimation section calculates a first-direction acceleration estimated value for a first position on the optical axis on the basis of a distance in the second direction between the optical axis and the first acceleration sensor, a distance in the second direction between the optical axis and the second acceleration sensor, a first-direction acceleration detected value provided by the first acceleration sensor, and a first-direction acceleration detected value provided by the second acceleration sensor. The second acceleration estimation section calculates a second-direction acceleration estimated value for the first position on the basis of a distance in the first direction between the optical axis and the first acceleration sensor, a distance in the first direction between the optical axis and the second acceleration sensor, a second-direction acceleration detected value provided by the first acceleration sensor, and a second-direction acceleration detected value provided by the second acceleration sensor. The blurring amount calculation section calculates a first-direction image blurring amount and a second-direction image blurring amount for the imaging apparatus by using the first-direction acceleration estimated value and the second-direction acceleration estimated value.

Another aspect of embodiments provides an image blurring amount calculation method for an imaging apparatus that includes an image shooting optical system for forming an image of a subject and first and second acceleration sensors disposed at different positions on a plane orthogonal to the optical axis of the image shooting optical system, the image blurring amount calculation method including: detecting, by the first acceleration sensor, a first-direction acceleration and a second-direction acceleration; detecting, by the second acceleration sensor, the first-direction acceleration and the second-direction acceleration; calculating a first-direction acceleration estimated value for a first position on the optical axis on the basis of a distance in the second direction between the optical axis and the first acceleration sensor, a distance in the second direction between the optical axis and the second acceleration sensor, a first-direction acceleration detected value provided by the first acceleration sensor, and a first-direction acceleration detected value provided by the second acceleration sensor; calculating a second-direction acceleration estimated value for the first position on the basis of a distance in the first direction between the optical axis and the first acceleration sensor, a distance in the first direction between the optical axis and the second acceleration sensor, a second-direction acceleration detected value provided by the first acceleration sensor, and a second-direction acceleration detected value provided by the second acceleration sensor; and calculating a first-direction image blurring amount and a second-direction image blurring amount for the imaging apparatus by using the first-direction acceleration estimated value and the second-direction acceleration estimated value.

BRIEF DESCRIPTION OF DRAWINGS

FIG. 20 illustrates an exemplary format of transmit data;

DESCRIPTION OF EMBODIMENTS

Figure 1:
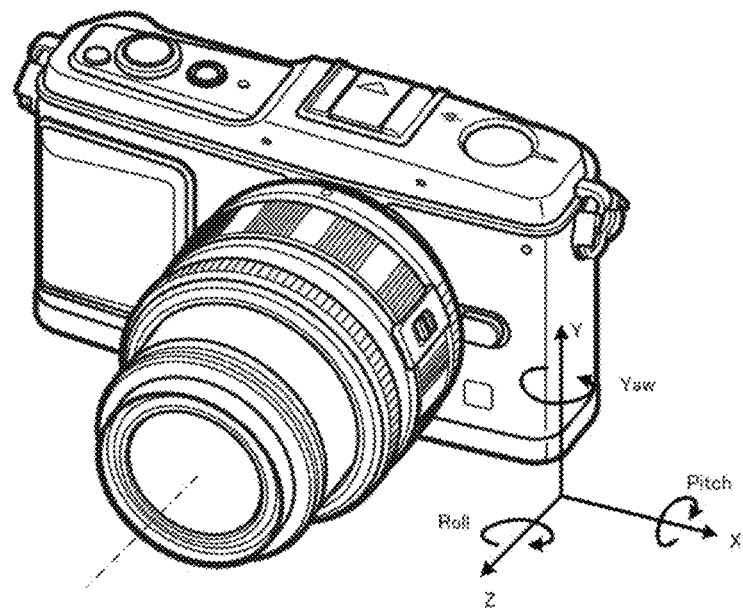
FIG. 1 illustrates a camera that is an imaging apparatus in accordance with embodiments.

Blurring detection using an acceleration sensor has conventionally had various problems.

When, for example, the movement of a camera is a complete translation (i.e., translational movement), a constant acceleration is detected irrespective of positions within the camera. However, when the camera movement includes a rotational motion, different velocities are detected according to positions within the camera.

To correct shift blurring, accelerations, movement velocities, or movement amounts need to be accurately detected for positions in the vicinity of a front principal-point position on the optical axis of an image shooting optical system. Due to limitations in the camera configuration, however, an acceleration sensor cannot be disposed in the vicinity of the front principal-point position on the optical axis of the image shooting optical system.

Embodiments described hereinafter were created in view of the above-described problems and provide an imaging apparatus and an image-blurring-amount calculation method therefor, the imaging apparatus being capable of accurately detecting accelerations and movement velocities for the front principal-point position of an image shooting optical system so that image blurring that could be caused by translation can be accurately corrected.

The following describes embodiments by referring to the drawings.

By referring to FIG. 1, first, descriptions will be given of directions defined for an imaging apparatus in accordance with embodiments.

FIG. 1 illustrates a camera that is an imaging apparatus in accordance with embodiments.

As depicted in FIG. 1, an X direction, a Y direction, a Z direction, a Yaw direction, a Pitch direction, and a Roll direction are defined for the camera, as will be described in the following.

The X direction is a left-right direction (horizontal direction) with reference to the camera. For the X direction, a right direction and a left direction when seeing the camera from front are respectively defined as a "+" direction and a "−" direction. The X direction also corresponds to a left-right direction with reference to the imaging plane of an image pickup element. The image pickup element will be described hereinafter.

The Y direction is an up-down direction (vertical direction) with reference to the camera. For the Y direction, an up direction and a down direction are respectively defined as a "+" direction and a "−" direction. The Y direction also corresponds to an up-down direction with reference to the imaging plane of the image pickup element.

The Z direction is the optical axis direction of an image shooting optical system of the camera. Descriptions will be given of the image shooting optical system hereinafter. For the Z direction, a direction from the back surface to front surface of the camera is defined as a "+" direction, and a direction from the front surface to back surface of the camera is defined as a "−" direction.

The Pitch direction is a direction of rotation about an axis extending in the X direction. For the Pitch direction, a left rotation as seen in the "+" X direction is defined as a "+" direction, and a right rotation as seen in the "+" X direction is defined as a "−" direction.

The Yaw direction is a direction of rotation about an axis extending in the Y direction. For the Yaw direction, a right rotation as seen in the "+" Y direction is defined as a "+" direction, and a left rotation as seen in the "+" Y direction is defined as a "−" direction.

The Roll direction is a direction of rotation about an axis extending in the Z direction. For the Roll direction, a left rotation as seen in the "+" Z direction is defined as a "+" direction, and a right rotation as seen in the "+" Z direction is defined as a "−" direction.

The positive and negative signs (+, −) of the directions defined in such a manner are not limited to those described above because such signs depend on a direction in which an angular velocity sensor or an acceleration sensor is mounted. Descriptions will be given of the angular velocity sensor and the acceleration sensor hereinafter.

Next, by referring to FIGS. 2 and 3, descriptions will be given of a concept of a process of calculating an acceleration estimated value that is performed by an imaging apparatus in accordance with embodiments.

Figure 2:
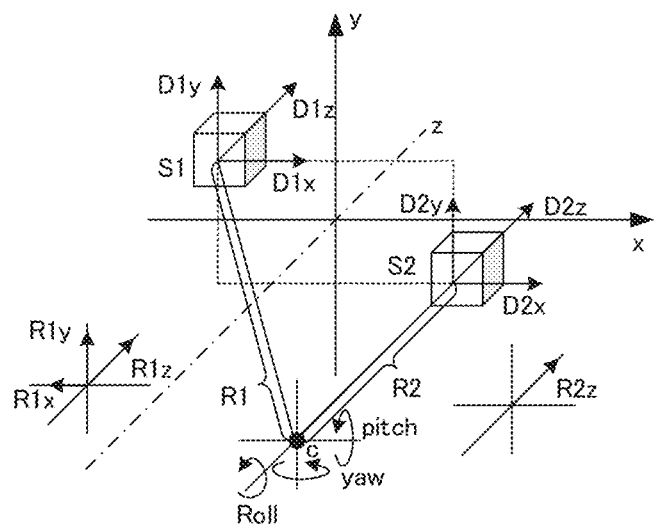
FIG. 2 illustrates a case where two acceleration sensors are disposed at different positions on a plane orthogonal to an optical axis extending in a Z direction.

FIG. 2 illustrates a case where two acceleration sensors are disposed at different positions on a plane orthogonal to an optical axis extending in the Z direction.

In the example depicted in FIG. 2, when a rotational motion about a rotation axis extending via point C has occurred (in this situation, point C is also a rotation center), two acceleration sensors S1 and S2 are translated.

In this situation, an X-direction translation amount D1$x$ and a Y-direction translation amount D1$y$ that are specific to the acceleration sensor S1 are determined in accordance with formulae (1) and (2) indicated below, and an X-direction translation amount D2$x$ and a Y-direction translation amount D2$y$ that are specific to the acceleration sensor S2 are determined in accordance with formulae (3) and (4) indicated below.

In these formulae, ωyaw, ωpitch, and ωroll indicate a Yaw-direction angular velocity, a Pitch-direction angular velocity, and a Roll-direction angular velocity; R1$x$, R1$y$, and R1$z$ indicate projections of a radius R1 (straight line linking the rotation center C and the acceleration sensor S1) in the X direction, the Y direction, and the Z-direction; and R2$x$, R2$y$, and R2$z$ indicate projections of a radius R2 (straight line linking the rotation center C and the acceleration sensor S2) in the X direction, the Y direction, and the Z direction. Note that R2$x$=0 and R2$y$=0 in the case depicted in FIG. 2.

$$D1x = \omega yaw \times R1z + \omega roll \times R1y \quad \text{Formula (1)}$$

$$D1y = \omega pitch \times R1z + \omega roll \times R1x \quad \text{Formula (2)}$$

$$D2x = \omega yaw \times R2z + \omega roll \times R2y = \omega yaw \times R2z \quad \text{Formula (3)}$$

$$D2y = \omega pitch \times R2z + \omega roll \times R2x = \omega pitch \times R2z \quad \text{Formula (4)}$$

In the case depicted in FIG. 2, R1$z$=R2$z$ is satisfied in accordance with a relationship in mounting position between the acceleration sensors S1 and S2.

Accordingly, when no rotational motions are made in the Roll direction, equal accelerations are obtained by the acceleration sensors S1 and S2, and when a rotational motion is made in the Roll direction, the acceleration sensors S1 and 2 have a difference in detection result therebetween. The detection error (difference in detection result) obtained in this situation results from the ratio between R1$y$ and R2$y$ for the X direction and results from the ratio between R1$x$ and R2$x$ for the y direction.

Accordingly, a result of detection (detected value) of an acceleration for an intersection point of the optical axis and the plane on which the acceleration sensors S1 and S2 are located (this is also a plane orthogonal to the optical axis) can be determined (estimated) on the basis of the distances from the intersection point to the individual mounting positions of the acceleration sensors and the detection results provided by the acceleration sensors S1 and S2.

Figure 3:
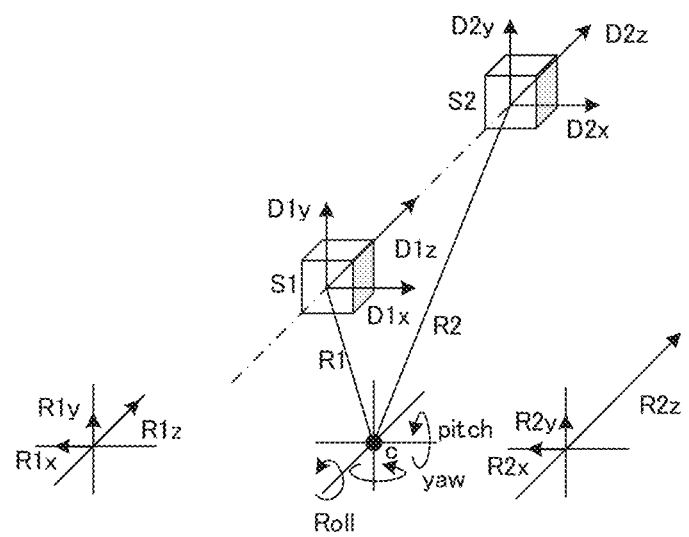
FIG. 3 illustrates a case where two acceleration sensors are disposed at different positions on an optical axis extending in a Z direction.

FIG. 3 illustrates a case where two acceleration sensors are disposed at different positions on an optical axis extending in the Z direction.

In the example depicted in FIG. 3, when a rotational motion has occurred with a rotation axis extending via point C (in this situation, point C is also a rotation center), two acceleration sensors S1 and S2 are translated, and translation amounts specific to the individual acceleration sensors are determined in accordance with formulae (1), (2), (3), and (4), as in the case depicted in FIG. 2.

In the case depicted in FIG. 3, however, R1$x$=R2$x$ and R1$y$=R2$y$ are satisfied in accordance with a relationship in mounting position between the acceleration sensors S1 and S2.

Accordingly, when a rotational motion has occurred in the Roll direction, the detection results provided by the acceleration sensors S1 and S2 have no differences therebetween, and when a rotational motion has occurred in the Yaw direction or the Pitch direction, the detection results provided by the acceleration sensors S1 and S2 have a difference therebetween. The detection error (difference in detection result) obtained in this situation results from the ratio between the distance in the Z direction from the rotation center C to the mounting position of one of the acceleration sensors and the distance in the Z direction from the rotation center C to the mounting position of the other of the acceleration sensors.

Accordingly, the result of detection (detected value) of an acceleration can be determined (estimated) for a position on the optical axis on the basis of the distances from the this position to the individual mounting positions of the acceleration sensors and the detection results provided by the acceleration sensors S1 and S2.

Therefore, when two or more acceleration sensors are disposed at different positions on the same plane, a detection result (detected value) of an acceleration can be estimated for an arbitrary point on this plane on the basis of detection results provided by the acceleration sensors and the ratio between the distances from the arbitrary point to the individual acceleration sensors.

When two or more acceleration sensors are disposed on the same straight line, a detection result (detected value) of an acceleration can be estimated for an arbitrary point on this line on the basis of detection results provided by the acceleration sensors and the ratio between the distances from the arbitrary point to the individual acceleration sensors.

Using such relationships, a detection result (detected value) of an acceleration can be estimated for the front principal-point position of the image shooting optical system.

In view of the descriptions above, the following describes the imaging apparatus in accordance with embodiments in detail.

First Embodiment

Figure 4:
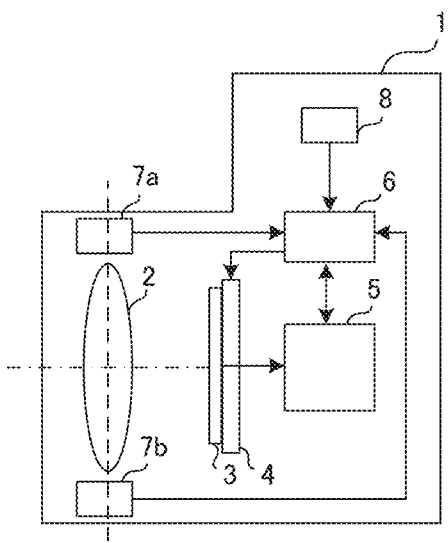
FIG. 4 illustrates an exemplary configuration of a camera that is an imaging apparatus in accordance with a first embodiment.

FIG. 4 illustrates an exemplary configuration of a camera that is an imaging apparatus in accordance with a first embodiment.

As depicted in FIG. 4, a camera 1 in accordance with the present embodiment includes an image shooting optical system 2, an image pickup element 3, a drive unit 4, a system controller 5, a blurring correction microcomputer 6, two acceleration sensors 7 (7a, 7b), and an angular velocity sensor 8.

The image shooting optical system 2 forms an optical image of a subject on the image pickup element 3.

The image pickup element 3 is an image sensor, e.g., a CCD or a CMOS, and converts an optical image of the subject (subject optical image) formed by the image shooting optical system 2 into an electric signal.

The system controller 5 reads, as a video image signal, the electric signal obtained by the image pickup element 3 as a result of the converting. For example, the video image signal that has been read may be recorded in a recording medium (not illustrated) (e.g., memory card) as a shot image or a video image. Operations of the camera 1 are performed under the control of the system controller 5.

The blurring correction microcomputer 6 calculates a correction amount on the basis of detection results provided by the acceleration sensors 7a and 7b and the angular velocity sensor 8 and instructs the drive unit 4 to move the image pickup element 3 in such a manner as to eliminate image blurring that has occurred on the imaging plane of the image pickup element 3.

For example, the system controller 5 and the blurring correction microcomputer 6 may each include a processor (e.g., CPU), a memory, and an electronic circuit. Operations of each of the system controller 5 and the blurring correction microcomputer 6 are implemented by, for example, the processor running a program stored in the memory.

The drive unit 4 is a drive mechanism that moves the image pickup element 3 on a plane orthogonal to the optical axis of the image shooting optical system 2 on the basis of an instruction from the blurring correction microcomputer 6.

The angular velocity sensor 8 detects rotational motions of the camera 1 that occur on three axes (rotational motions in the Yaw direction, the Pitch direction, and the Roll direction).

The two acceleration sensors 7 (7a, 7b) are disposed (mounted) on a plane that includes the front principal-point position of the image shooting optical system 2 and that is orthogonal to the optical axis of the image shooting optical system 2 in a manner such that the acceleration sensors 7 face each other with the optical axis as the center point (midpoint) therebetween. The acceleration sensors 7 each detect X-direction and Y-direction accelerations.

Information on the mounting position of each of the acceleration sensors 7 is recorded in advance in an internal ROM of the blurring correction microcomputer 6 as coordinate information pertaining to the X direction and the Y direction with a point on the optical axis as an origin. This information is used to calculate an acceleration estimated value. The calculation process will be described hereinafter. In the present embodiment, however, since the two acceleration sensors 7 are disposed to face each other with the optical axis as the center point therebetween, an acceleration estimated value can be calculated without using information on the mounting positions of the acceleration sensors 7, as will be described in detail hereinafter. Hence, the present embodiment may be such that information on the mounting position of the acceleration sensors 7 is not retained.

Figure 5:
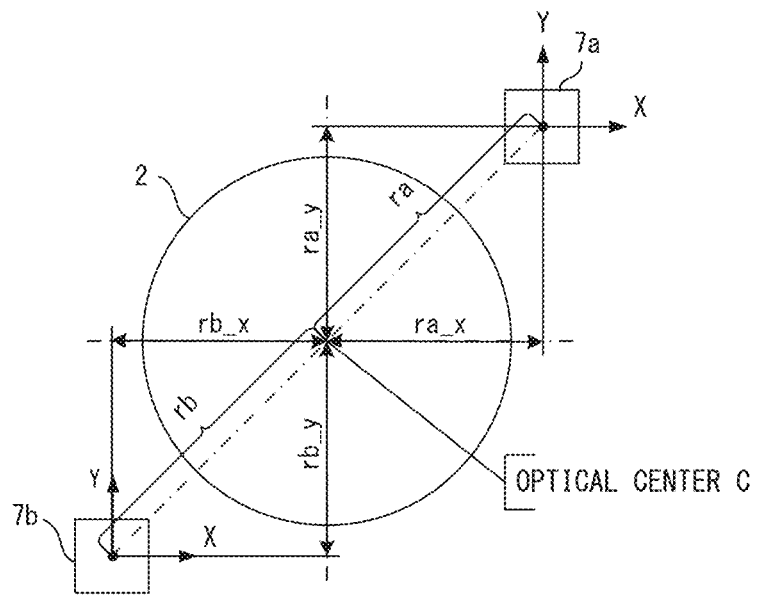
FIG. 5 illustrates an image shooting optical system and two acceleration sensors in accordance with a first embodiment as seen in an optical axis direction (as seen from the front of a camera)

FIG. 5 illustrates the image shooting optical system 2 and the two acceleration sensors 7 (7a, 7b) as seen in an optical axis direction (as seen from the front of the camera).

As depicted in FIG. 5, the two acceleration sensors 7 (7a, 7b) are equally distant from the optical axis. Accordingly, distance ra, i.e., the distance from the optical axis to the acceleration sensor 7a, is equal to distance rb, i.e., the distance from the optical axis to the acceleration sensor 7b (ra=rb). Distance ra is also the distance from the front principal-point position (optical center C) of the image shooting optical system 2 to the acceleration sensor 7a. Distance rb is also the distance from the front principal-point position (optical center C) of the image shooting optical system 2 to the acceleration sensor 7b.

Accordingly, the average of detection results provided by the two acceleration sensors 7 (7a, 7b) may be determined to calculate (estimate) detection results of X-direction and Y-direction accelerations for the front principal-point position of the image shooting optical system 2.

ra_x and ra_y indicate an X component and Y component of distance ra. rb_x and rb_y indicate an X component and Y component of distance rb.

Figure 6:
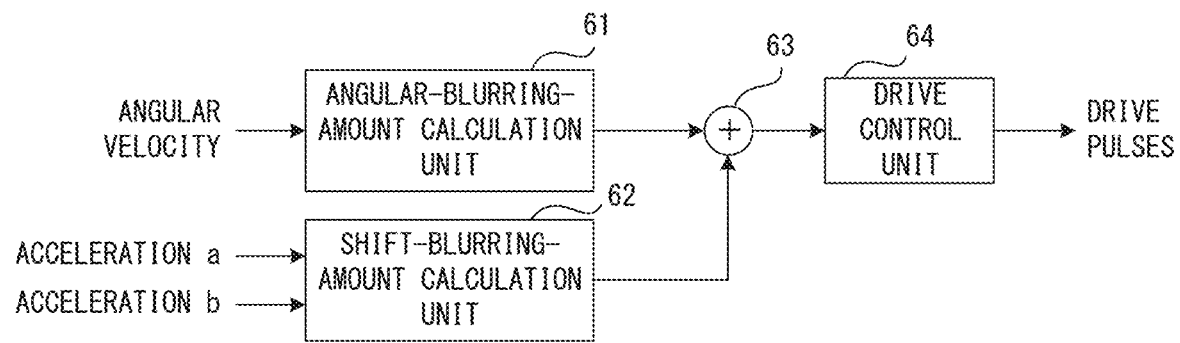
FIG. 6 illustrates an exemplary internal configuration of a blurring correction microcomputer in accordance with a first embodiment.

FIG. 6 illustrates an exemplary internal configuration of the blurring correction microcomputer 6.

As depicted in FIG. 6, the blurring correction microcomputer 6 includes an angular-blurring-amount calculation unit 61, a shift-blurring-amount calculation unit 62, an addition unit 63, and a drive control unit 64.

The angular-blurring-amount calculation unit 61 calculates, on the basis of an angular-velocity-detection result provided by the angular velocity sensor 8, X-direction and Y-direction image blurring amounts of image blurring that occurs on the imaging plane of the image pickup element 3 due to a rotational motion of the camera 1 and calculates X-direction and Y-direction correction amounts (rotational-blurring correction amounts) to cancel out the image blurring amounts.

The shift-blurring-amount calculation unit 62 calculates, on the basis of a detection result provided by the acceleration sensor 7a (acceleration a) and a detection result provided by the acceleration sensor 7b (acceleration b), X-direction and Y-direction image blurring amounts of image blurring that occurs on the imaging plane of the image pickup element 3 due to translation of the camera 1 and calculates X-direction and Y-direction correction amounts (shift-blurring correction amounts) to cancel out the image blurring amounts. The internal configuration of the shift-blurring-amount calculation unit 62 will be described hereinafter by referring to FIG. 7.

For each of the X and Y directions, the addition unit 63 sums the correction amounts calculated by the angular-blurring-amount calculation unit 61 and the shift-blurring-amount calculation unit 62.

The drive control unit 64 converts the correction amounts summed for each of the X and Y directions by the addition unit 63 into drive pulses for driving the drive unit 4 and outputs the drive pluses to the drive unit 4. The drive unit 4 is driven in accordance with the drive pluses so as to move the image pickup element 3. Accordingly, the image pickup element 3 is moved to eliminate image blurring that occurs on the imaging plane of the image pickup element 3.

Figure 7:
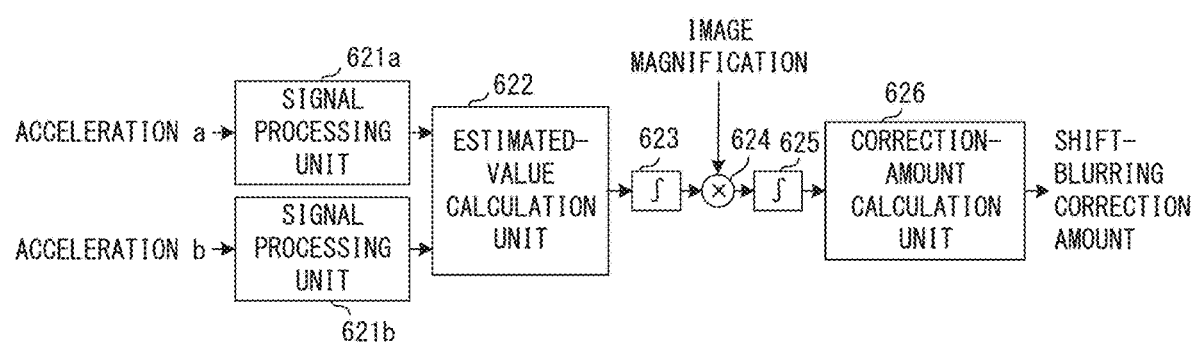
FIG. 7 illustrates an exemplary internal configuration of a shift-blurring-amount calculation unit in accordance with a first embodiment.

FIG. 7 illustrates an exemplary internal configuration of the shift-blurring-amount calculation unit 62.

As depicted in FIG. 7, the shift-blurring-amount calculation unit 62 includes two signal processing units 621 (621a, 621b), an estimated-value calculation unit 622, an integration unit 623, a multiplication unit 624, an integration unit 625, and a correction-amount calculation unit 626.

The signal processing units 621 each apply, for example, processing for removing gravitational components and filter processing (processing for removing low frequency components) to X-direction and Y-direction accelerations that have been input thereto. Accordingly, the X-direction and Y-direction accelerations that have been input are converted into a value of 0 when the camera is in a stationary state and otherwise each into a digital value, wherein the absolute value of the digital value indicates the magnitude of the acceleration, and the sign of the digital value indicates the direction of the acceleration. In the present embodiment, X-direction and Y-direction accelerations a detected by the acceleration sensor 7a are input to, and then processed by, the signal processing unit 621a, and X-direction and Y-direction accelerations b detected by the acceleration sensor 7b are input to, and then processed by, the signal processing unit 621b.

In accordance with the ratio between the distances from the front principal-point position (optical axis) to the individual mounting positions of the acceleration sensors 7, the estimated-value calculation unit 622 calculates X-direction and Y-direction acceleration estimated values Xc and Yc for the front principal-point position by using formulae (5) and (6).

$$Xc = \frac{Xa \times rb\_y + Xb \times ra\_y}{ra\_y + rb\_y} \quad \text{Formula (5)}$$

$$Yc = \frac{Ya \times rb\_x + Yb \times ra\_x}{ra\_x + rb\_x} \quad \text{Formula (6)}$$

In these formulae, Xa and Ya indicate X-direction and Y-direction accelerations a after the processing performed by the signal processing unit 621a (X-direction and Y-direction processing results provided by the signal processing unit 621a); Xb and Yb indicate X-direction and Y-direction accelerations b after the processing performed by the signal processing unit 621b (X-direction and Y-direction processing results provided by the signal processing unit 621b); ra_x and ra_y indicate the X-direction component and Y-direction component of ra, as depicted in FIG. 5; and rb_x and rb_y indicate the X-direction component and Y-direction component of rb, as depicted in FIG. 5. Accordingly, ra_x and ra_y are coordinate information of the mounting position of the acceleration sensor 7a, and rb_x and rb_y are coordinate information of the mounting position of the acceleration sensor 7b.

In the present embodiment, ra is equal to rb, ra_x is equal to rb_x, and ra_y is equal to rb_y; hence, formulae (5) and (6) are expressed as formula (7) and (8). Accordingly, acceleration estimated values Xc and Yc may be calculated through averaging.

$$Xc = \frac{(Xa + Xb)}{2} \quad \text{Formula (7)}$$

$$Yc = \frac{(Ya + Yb)}{2} \quad \text{Formula (8)}$$

The internal configuration of the estimated-value calculation unit 622 will be described hereinafter by referring to FIG. 8.

The integration unit 623 integrates, with respect to time, X-direction and Y-direction acceleration estimated values calculated by the estimated-value calculation unit 622 so as to calculate X-direction and Y-direction movement velocities for the front principal-point position.

The multiplication unit 624 multiplies the X-direction and Y-direction movement velocities calculated by the integration unit 623 by an image magnification of the image shooting optical system 2 so as to convert these velocities into the velocities of the image movements in the X direction and the Y direction on the imaging plane of the image pickup element 3.

The integration unit 625 integrates, with respect to time, the velocities of the image movements in the X direction and the Y direction on the imaging plane, i.e., the multiplication results provided by the multiplication unit 624, so as to calculate the amounts of the image movements in the X direction and the Y direction on the imaging plane (image blurring amounts).

The correction-amount calculation unit 626 calculates X-direction and Y-direction correction amounts (shift-blurring correction amounts) for canceling out the X-direction and Y-direction image blurring amounts calculated by the integration unit 625.

In the present embodiment, as seen in the processing performed by the estimated-value calculation unit 622 and the integration unit 623, accelerations are calculated (estimated) for the front principal-point position, and on the basis of these accelerations, movement velocities are calculated for the front principal-point position. However, the calculation of movement velocities is not limited to this. For example, movement velocities may be calculated for the mounting positions of the acceleration sensors 7, and on the basis of these movement velocities, movement velocities may be calculated (estimated) for the front principal-point position. However, the processing performed by the estimated-value calculation unit 622 and the integration unit 623 will be desirable for removing noise components possibly included in the detection results provided by the acceleration sensors 7.

Figure 8:
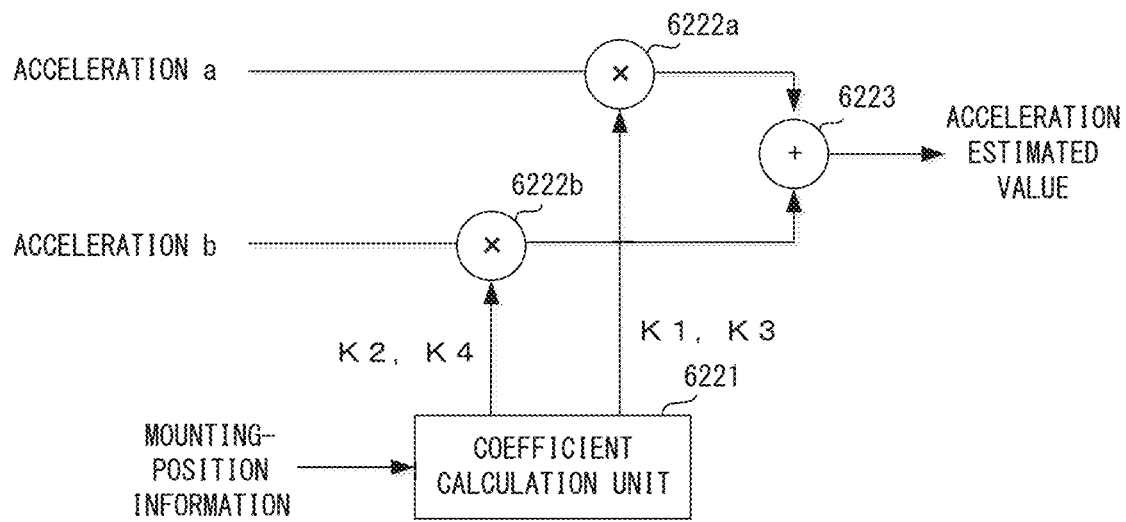
FIG. 8 illustrates an exemplary internal configuration of an estimated-value calculation unit in accordance with a first embodiment.

FIG. 8 illustrates an exemplary internal configuration of the estimated-value calculation unit 622.

As depicted in FIG. 8, the estimated-value calculation unit 622 includes a coefficient calculation unit 6221, two multiplication units 6222 (6222a, 6222b), and an addition unit 6223.

The coefficient calculation unit 6221 calculates calculation coefficients K1, K2, K3, and K4 on the basis of information on the mounting positions of the acceleration sensors 7. Calculation coefficients K1 and K2 are used to calculate an X-direction acceleration estimated value, and K1=rb_y/(ra_y+rb_y) and K2=ra_y/(ra_y+rb_y) are satisfied. Calculation coefficients K3 and K4 are used to calculate a Y-direction acceleration estimated value, and K3=rb_x/(ra_x+rb_x) and K4=ra_x/(ra_x+rb_x) are satisfied.

In the present embodiment, the mounting positions of the acceleration sensors 7a and 7b and the distance from each acceleration sensor to the optical axis are not changed, and hence calculation coefficients K1, K2, K3, and K4 may be fixed values.

X-direction and Y-direction accelerations a (Xa, Ya) after the processing performed by the signal processing unit 621a are input to the multiplication unit 6222a. The multiplication unit 6222a multiplies the X-direction acceleration Xa by calculation coefficient K1 and multiplies the Y-direction acceleration Ya by calculation coefficient K3.

X-direction and Y-direction accelerations b (Xb, Yb) after the processing performed by the signal processing unit 621b are input to the multiplication unit 6222b. The multiplication unit 6222b multiplies the X-direction acceleration Xb by calculation coefficient K2 and multiplies the Y-direction acceleration Yb by calculation coefficient K4.

The addition unit 6223 adds K1×Xa, i.e., the multiplication result provided by the multiplication unit 6222a, to K2×Xb, i.e., the multiplication result provided by the multiplication unit 6222b, so as to calculate an X-direction acceleration estimated value Xc. The addition unit 6223 also adds K3×Ya, i.e., the multiplication result provided by the multiplication unit 6222a, to K4×Yb, i.e., the multiplication result provided by the multiplication unit 6222b, so as to calculate a Y-direction acceleration estimated value Yc.

As described above, the present embodiment is such that the two acceleration sensors 7 are disposed on a plane that includes the front principal-point position of the image shooting optical system 2 (also on a plane orthogonal to the optical axis of the image shooting optical system 2), so that accelerations can be calculated (estimated) for the front principal-point position on the basis of the ratio between the distances from the optical axis to the individual mounting positions of the acceleration sensors 7 and the detection results provided by the acceleration sensors. Accordingly, shift blurring can be accurately corrected by making blur corrections on the basis of the accelerations.

Figure 9:
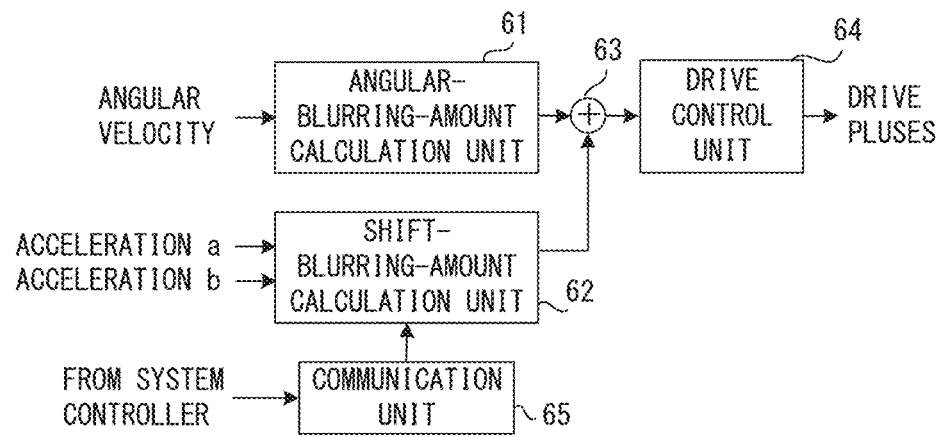
FIG. 9 illustrates an exemplary internal configuration of a blurring correction microcomputer in accordance with a variation of a first embodiment.
Figure 10:
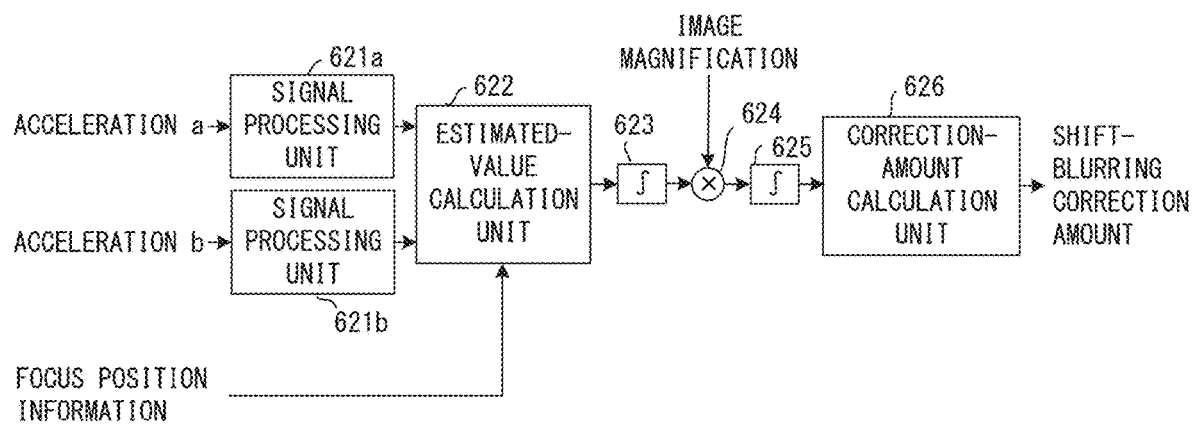
FIG. 10 illustrates an exemplary internal configuration of a shift-blurring-amount calculation unit in accordance with a variation of a first embodiment.
Figure 11:
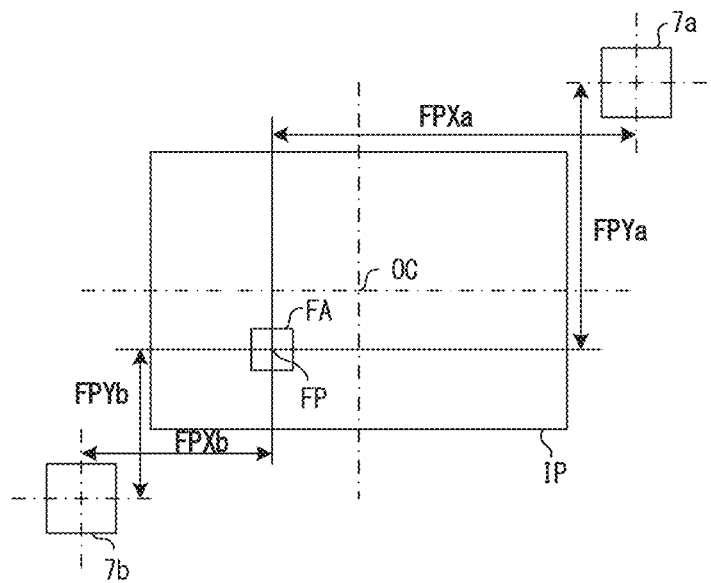
FIG. 11 illustrates two acceleration sensors and an imaging plane of an image pickup element in accordance with a variation of a first embodiment as seen in an optical axis direction (as seen from the front of a camera)

The following describes a variation of the embodiment by referring to FIGS. 9-11.

In this variation, for example, the two acceleration sensors 7 may be disposed at different positions on a plane that includes the imaging plane of the image pickup element 3, as with two acceleration sensors 15 (15a, 15b) indicated in FIG. 12 (this will be described hereinafter), and accelerations are estimated for the position of a focus area on the imaging plane.

FIG. 9 illustrates an exemplary internal configuration of the blurring correction microcomputer 6 in accordance with this variation.

As indicated in FIG. 9, the blurring correction microcomputer 6 in accordance with this variation is different from the blurring correction microcomputer 6 depicted in FIG. 6 in that the former blurring correction microcomputer 6 further includes a communication unit 65 and focus position information is input from the system controller 5 to the shift-blurring-amount calculation unit 62 via the communication unit 65. The focus position information indicates a focused-on position on the imaging plane of the image pickup element 3 that is provided when the image shooting optical system 2 is adjusted by a focus adjustment mechanism (not illustrated). The focus-on position is obtained by the system controller 5.

FIG. 10 illustrates an exemplary internal configuration of the shift-blurring-amount calculation unit 62 in accordance with this variation.

As indicated in FIG. 10, the shift-blurring-amount calculation unit 62 in accordance with this variation is different from the shift-blurring-amount calculation unit 62 depicted in FIG. 7 in that focus position information is input to the estimated-value calculation unit 622 and that the estimated-value calculation unit 622 calculates an acceleration estimated value for the focus position.

By referring to FIG. 11, the following describes the calculation of an acceleration estimated value performed by the estimated-value calculation unit 622 in accordance with this variation.

FIG. 11 illustrates the two acceleration sensors 7 (7a, 7b) and the imaging plane of the image pickup element 3 in accordance with this variation as seen in the optical axis direction (as seen from the front of the camera)

In FIG. 11, IP indicates an imaging plane; OC, an optical axis; FA, a focus area; FP, a focus point (center of focus area FA). In this variation, the two acceleration sensors 7 are also disposed (mounted) in such a manner as to face each other with the optical axis as the center point (midpoint) therebetween.

Let FPXa and FPYa respectively indicate the distances in the X and Y directions from the acceleration sensor 7a to the focus point FP, and let FPXb and FPYb respectively indicate the distances in the X and Y directions from the acceleration sensor 7b to the focus point FP. Let Aax and Aay respectively indicate X-direction and Y-direction accelerations detected by the acceleration sensor 7a, and let Abx and Aby respectively indicate X-direction and Y-direction accelerations detected by the acceleration sensor 7b.

In this case, $A_{FPX}$ and $A_{FPY}$, which respectively indicate X-direction and Y-direction accelerations for the focus point FP, are determined in accordance with formula (9) and (10) on the basis of formulae (5) and (6).

$$A_{FPX} = \frac{Aax \times FPYb + Abx \times FPYa}{FPYa + FPYb} \quad \text{Formula (9)}$$

$$A_{FPY} = \frac{Aay \times FPXb + Aby \times FPXa}{FPXa + FPXb} \quad \text{Formula (10)}$$

Accordingly, focus position information (including information on the focus area FA and the focus point FP) is input to the coefficient calculation unit 6221 (see FIG. 8) provided within the estimated-value calculation unit 622 in accordance with this embodiment. Then, the coefficient calculation unit 6221 calculates coefficients K1, K2, K3, and K4 in accordance with FPYb/(FPYa+FPYb), FPYa/(FPYa+FPYb), FPXb/(FPXa+FPXb), and FPXa/(FPXa+FPXb), respectively.

This variation allows image blurring to be accurately reduced for a focused position (position of the focus point FA).

Second Embodiment

Figure 12:
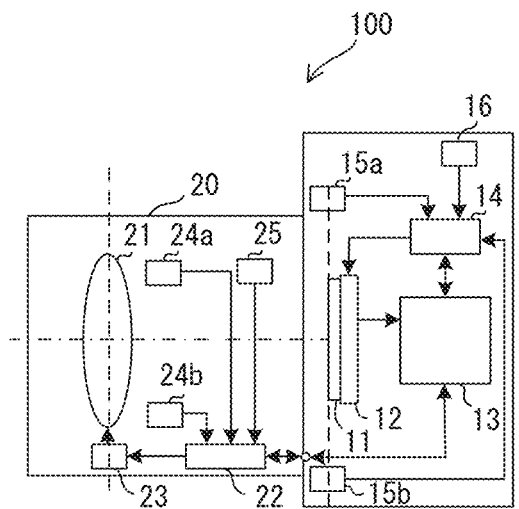
FIG. 12 illustrates an exemplary configuration of a camera system that is an imaging apparatus in accordance with a second embodiment.

FIG. 12 illustrates an exemplary configuration of a camera system that is an imaging apparatus in accordance with a second embodiment.

As depicted in FIG. 12, a camera system 100 in accordance with the present embodiment includes a camera body 10 and an interchangeable lens 20. The interchangeable lens 20 can be attached to and detached from the camera body 10. The camera body 10 and interchangeable lens 20 of the camera system 100 each have a shake (rotational blurring) correction function and a shift-blurring correction function.

The camera body 10 includes an image pickup element 11, a drive unit 12, a system controller 13, a blurring correction microcomputer 14, two acceleration sensors 15 (15a, 15b), and an angular velocity sensor 16. The interchangeable lens 20 includes an image shooting optical system 21, a lens control unit (LCU) 22, a drive unit 23, two acceleration sensors 24 (24a, 24b), and an angular velocity sensor 25.

The image shooting optical system 21 forms an optical image of a subject on the image pickup element 11.

The image pickup element 11 is an image sensor, e.g., a CCD or a CMOS, and converts an optical image of the subject (subject optical image) formed by the image shooting optical system 21 into an electric signal.

The system controller 13 reads, as a video image signal, the electric signal obtained by the image pickup element 11 as a result of the converting. For example, the video image signal that has been read may be recorded in a recording medium (not illustrated) (e.g., memory card) as a shot image or a video image.

The system controller 13 includes a communication unit (not illustrated). This communication unit allows the system controller 13 to communicate with the LCU 22 via a mount (not illustrated) so as to obtain information on the interchangeable lens 20. The system controller 13 determines on the basis of the information on the interchangeable lens 20 whether the interchangeable lens 20 has a blurring correction function. When the interchangeable lens 20 has a blurring correction function, image blurring would occur due to overcorrection if the blurring correction functions of both the camera body 10 and the interchangeable lens 20 were concurrently operated. Accordingly, when the interchangeable lens 20 has a blurring correction function, the system controller 13 selects a blurring correction method wherein the blurring correction function of either the camera body 10 or the interchangeable lens 20 is stopped or a blurring correction method wherein the camera body 10 and the interchangeable lens 20 together make a blurring correction with the operation load shared therebetween at a certain ratio. Then, the system controller 13 performs control to make a blurring correction in accordance with the selected blurring correction method.

The system controller 13 generates a synchronization signal for synchronizing the operation of the camera body 10 with the operation of the interchangeable lens 20. The communication unit reports the synchronization signal to the LCU 22 and the blurring correction microcomputer 14. Accordingly, for example, when a rising edge of a pulse signal that serves as the synchronization signal is detected, both the camera body and the interchangeable lens 20 may start operations determined in advance, with the result that the operations of the camera body 10 and the interchangeable lens 20 are synchronized with each other.

The two acceleration sensors 24 (24a, 24b) are disposed (mounted) on a plane orthogonal to the optical axis of the image shooting optical system 2 in a manner such that the acceleration sensors 7 face each other with the optical axis as the center point (midpoint) therebetween. The acceleration sensors 24 each detect X-direction and Y-direction accelerations. Information on the mounting position of each of the acceleration sensors 24 is recorded in advance in an internal ROM of the LCU 22 as coordinate information pertaining to the X direction, the Y direction, and the Z direction with a point on the optical axis as an origin. This information is used to calculate an acceleration estimated value and a movement velocity (the calculation process will be described hereinafter). However, also in the present embodiment, since the two acceleration sensors 24 are disposed to face each other with the optical axis as the center point therebetween, coordinate information pertaining to the X direction and the Y direction does not necessarily need to be retained as information on the mounting positions of the acceleration sensors 7.

The angular velocity sensor 25 detects rotational motions of the camera system 100 that occur on three axes (rotational motions in the Yaw direction, the Pitch direction, and the Roll direction).

The LCU 22 calculates a correction amount on the basis of detection results provided by the acceleration sensors 24a and 24b and the angular velocity sensor 25 and instructs the drive unit 23 to move a correction lens (not illustrated) included in the image shooting optical system 21 in such a manner as to eliminate image blurring that has occurred on the imaging plane of the image pickup element 11. The internal configuration of the LCU 22 will be described hereinafter by referring to FIG.

The drive unit 23 is a drive mechanism that moves the collection lens included in the image shooting optical system 21 on a plane orthogonal to the optical axis of the image shooting optical system 2 on the basis of an instruction from the LCU 22.

The two acceleration sensors 15 (15a, 15b) are located on a plane that includes the imaging plane of the image pickup element 11 and disposed (mounted) in such a manner as to face each other with an imaging center of the image pickup element 11 as the center point (midpoint) therebetween, wherein this imaging center is one achieved when the image pickup element 11 is located at an initial position. The imaging plane of the image pickup element 11 is orthogonal to the optical axis of the image shooting optical system 21. When the image pickup element 11 is located at the initial position, the imaging center of the image pickup element 11 coincides with the optical axis. The acceleration sensors 15 each detect X-direction and Y-direction accelerations. Information on the mounting position of each of the acceleration sensors 15 is recorded in advance in an internal ROM of the blurring correction microcomputer 14 as coordinate information pertaining to the X direction, the Y direction, and the Z direction with a point on the optical axis as an origin. This information is used to calculate an acceleration estimated value and a movement velocity (the calculation process will be described hereinafter). However, also in the present embodiment, since the two acceleration sensors 24 are disposed to face each other with the optical axis as the center point therebetween, coordinate information pertaining to the X direction and the Y direction does not necessarily need to be retained as information on the mounting positions of the acceleration sensors 7.

The angular velocity sensor 16 detects rotational motions of the camera system 100 that occur on three axes (rotational motions in the Yaw direction, the Pitch direction, and the Roll direction).

The blurring correction microcomputer 14 calculates a correction amount on the basis of detection results provided by the acceleration sensors 15a and 15b and the angular velocity sensor 16 and instructs the drive unit 12 to move the image pickup element 11 in such a manner as to eliminate image blurring that has occurred on the imaging plane of the image pickup element 11. The internal configuration of the blurring correction microcomputer 14 will be described hereinafter by referring to FIG. 17.

The drive unit 12 is a drive mechanism that moves the image pickup element 11 on a plane orthogonal to the optical axis of the image shooting optical system 2 on the basis of an instruction from the blurring correction microcomputer 14.

The system controller 13 of the camera system 100 controls operations of the camera system 100. The LCU 22 controls operations of the interchangeable lens 20 under the control of the system controller 13. For example, the system controller 13, the blurring correction microcomputer 14, and the LCU 22 may each include a processor (e.g., CPU), a memory, and an electronic circuit. Operations of each of the system controller 13, the blurring correction microcomputer 14, and the LCU 22 are implemented by, for example, the processor running a program stored in the memory.

Figure 13:
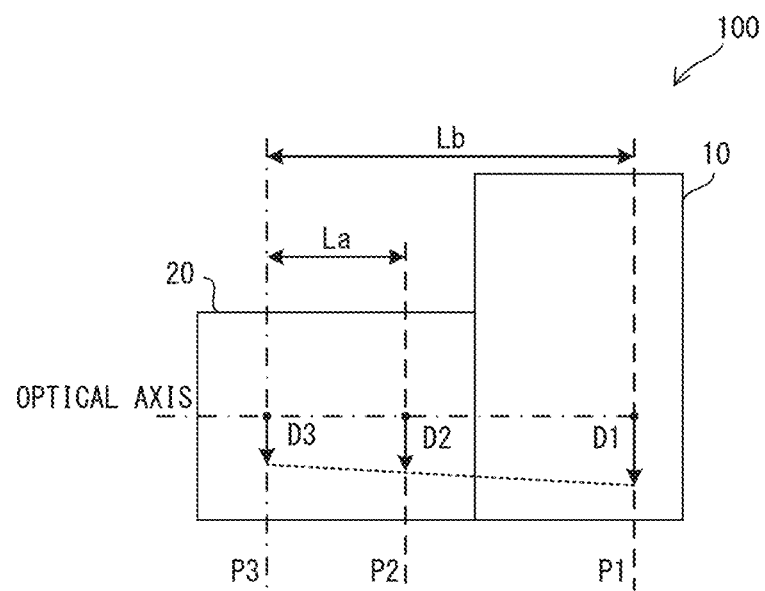
FIG. 13 illustrates a relationship in movement amount between individual positions on the optical axis of an image shooting optical system of a camera system in accordance with a second embodiment.

FIG. 13 illustrates a relationship in movement amount between individual positions on the optical axis of the image shooting optical system 21 of the camera system 100.

In FIG. 13, P1 indicates a mounting plane for the acceleration sensor 15 on the camera-body-10 side and also a plane that includes the imaging plane of the image pickup element 11; P2 indicates a mounting plane for two acceleration sensors 24 on the interchangeable-lens-20 side and also a plane orthogonal to the optical axis of the image shooting optical system 21; and P3 indicates a plane that includes the front principal-point position of the image shooting optical system 21 and also a plane orthogonal to the optical axis of the image shooting optical system 21.

Let Lb indicate the distance from the front principal-point position to the mounting plane P1; La, the distance from the front principal-point position to the mounting plane P2; D1, a movement amount for the intersection point of the mounting plane P1 and the optical axis; D2, a movement amount for the intersection point of the mounting plane P2 and the optical axis. In this case, D3, which indicates a movement amount for the front principal-point position, is determined in accordance with formula (11).

$$D3 = \frac{(Lb \times D2 - La \times D1)}{(Lb - La)} \quad \text{Formula (11)}$$

An acceleration and a movement velocity may be determined for the front principal-point position in the same manner as the movement amount. For example, an acceleration may be determined for the front principal-point position, in the same manner as the movement amount, on the basis of the distances La and Lb, an acceleration determined for the intersection point of the mounting plane P1 and the optical axis, and an acceleration determined for the intersection point of the mounting plane P2 and the optical axis. A movement velocity may be determined for the front principal-point position, in the same manner as the movement amount, on the basis of the distances La and Lb, a movement velocity determined for the intersection point of the mounting plane P1 and the optical axis, and a movement velocity determined for the intersection point of the mounting plane P2 and the optical axis.

Figure 14:
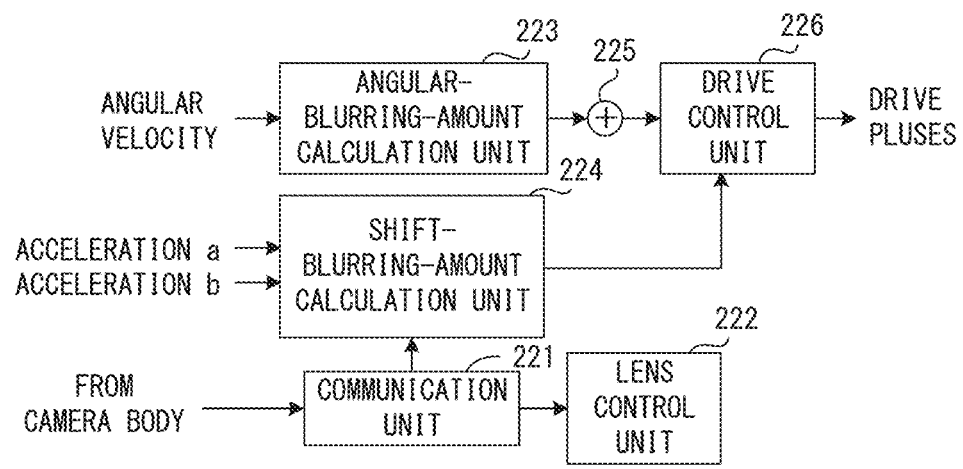
FIG. 14 illustrates an exemplary internal configuration of an LCU in accordance with a second embodiment.

FIG. 14 illustrates an exemplary internal configuration of the LCU 22.

As depicted in FIG. 14, the LCU 22 includes a communication unit 221, a lens control unit 222, an angular-blurring-amount calculation unit 223, a shift-blurring-amount calculation unit 224, an addition unit 225, and a drive control unit 226.

The communication unit 221 communicates with the system controller 13 of the camera body 10 via a mount. For example, the communication unit 221 may receive an instruction pertaining to lens control from the system controller 13 and output this instruction to the lens control unit 222. The communication unit 221 obtains movement velocities calculated by the camera body 10 from the system controller 13 and outputs these velocities to the shift-blurring-amount calculation unit 224. These movement velocities are X-direction and Y-direction movement velocities determined for the intersection point of the optical axis and the mounting plane P1. The communication unit 221 also outputs a synchronization signal reported from the camera body 10 to the shift-blurring-amount calculation unit 224.

The lens control unit 222 controls the focus and the aperture on the basis of an instruction pertaining to lens control output from the communication unit 221.

On the basis of an angular-velocity-detection result provided by the angular velocity sensor 25, the angular-blurring-amount calculation unit 223 calculates X-direction and Y-direction image blurring amounts of image blurring that occurs on the imaging plane of the image pickup element 11 due to rotational motions of the camera system 100 and calculates X-direction and Y-direction correction amounts (rotational-blurring correction amounts) to cancel out the image blurring amounts.

The shift-blurring-amount calculation unit 224 calculates, on the basis of a detection result provided by the acceleration sensor 24a (acceleration a), a detection result provided by the acceleration sensor 24b (acceleration b), and a movement velocity calculated by the camera body 10, X-direction and Y-direction image blurring amounts of image blurring that occurs on the imaging plane of the image pickup element 11 due to translation of the camera system 100 and calculates X-direction and Y-direction correction amounts (shift-blurring correction amounts) to cancel out the image blurring amounts. The internal configuration of the shift-blurring-amount calculation unit 224 will be described hereinafter by referring to FIG. 15.

For each of the X and Y directions, the addition unit 225 sums the correction amounts calculated by the angular-blurring-amount calculation unit 223 and the shift-blurring-amount calculation unit 224.

The drive control unit 226 converts the correction amounts summed for each of the X and Y directions by the addition unit 225 into drive pulses for driving the drive unit 23 and outputs the drive pluses to the drive unit 23. The drive unit 23 is driven in accordance with the drive pluses so as to move the correction lens included in the image shooting optical system 21. Accordingly, the collection lens is moved to eliminate image blurring that occurs on the imaging plane of the image pickup element 3.

Figure 15:
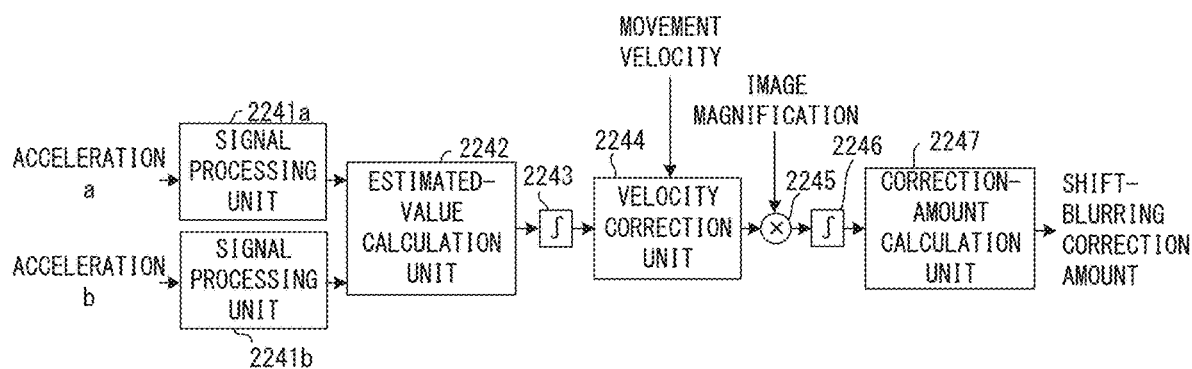
FIG. 15 illustrates an exemplary internal configuration of a shift-blurring-amount calculation unit within an LCU in accordance with a second embodiment.

FIG. 15 illustrates an exemplary internal configuration of the shift-blurring-amount calculation unit 224.

As depicted in FIG. 15, the shift-blurring-amount calculation unit 224 includes two signal processing units 2241 (2241a, 2241b), an estimated-value calculation unit 2242, an integration unit 2243, a velocity correction unit 2244, a multiplication unit 2245, an integration unit 2246, and a correction-amount calculation unit 2247.

The signal processing units 2241 each apply, for example, processing for removing gravitational components and filter processing to X-direction and Y-direction accelerations that have been input thereto. Accordingly, the X-direction and Y-direction accelerations that have been input are converted into a value of 0 when the camera is in a stationary state and otherwise each into a digital value, wherein the absolute value of the digital value indicates the magnitude of the acceleration, and the sign of the digital value indicates the direction of the acceleration. In the present embodiment, X-direction and Y-direction accelerations a detected by the acceleration sensor 24a are input to, and then processed by, the signal processing unit 2241a, and X-direction and Y-direction accelerations b detected by the acceleration sensor 24b are input to, and then processed by, the signal processing unit 2241b.

In accordance with the ratio between the distances from the optical axis to the individual mounting positions of the acceleration sensors 24, the estimated-value calculation unit 2242 calculates X-direction and Y-direction acceleration estimated values for the intersection point of the optical axis and the mounting plane P2 on the basis of formulae (5) and (6) (or formulae (7) and (8)).

The integration unit 2243 integrates, with respect to time, X-direction and Y-direction acceleration estimated values calculated by the estimated-value calculation unit 2242 so as to calculate X-direction and Y-direction movement velocities for the intersection point of the optical axis and the mounting plane P2.

On the basis of the X-direction and Y-direction movement velocities calculated by the integration unit 2243 for the intersection point of the optical axis and the mounting plane P2 and X-direction and Y-direction movement velocities calculated by the camera body 10 for the intersection point of the optical axis and the mounting plane P1, the velocity correction unit 2244 calculates X-direction and Y-direction movement velocities for the front principal-point position in accordance with formula (11). In this case, the X-direction movement velocity may be calculated for the front principal-point position by replacing D2 and D1 in formula (11) with the X-direction movement velocity calculated for the intersection point of the optical axis and the mounting plane P2 and the X-direction movement velocity calculated for the intersection point of the optical axis and the mounting plane P1. Similarly, the Y-direction movement velocity may be calculated for the front principal-point position. The internal configuration of the velocity correction unit 2244 will be described hereinafter by referring to FIG. 16.

The multiplication unit 2245 multiplies the X-direction and Y-direction movement velocities calculated by the velocity correction unit 2244 for the front principal-point position by an image magnification of the image shooting optical system 21 so as to convert these velocities into the velocities of the image movements in the X direction and the Y direction on the imaging plane of the image pickup element 11.

The integration unit 2246 integrates, with respect to time, the velocities of the image movements in the X direction and the Y direction on the imaging plane, i.e., the multiplication results provided by the multiplication unit 2245, so as to calculate the amounts of the image movements in the X direction and the Y direction on the imaging plane (image blurring amounts).

The correction-amount calculation unit 2247 calculates X-direction and Y-direction correction amounts (shift-blurring correction amounts) for canceling out the X-direction and Y-direction image blurring amounts calculated by the integration unit 2246.

Figure 16:
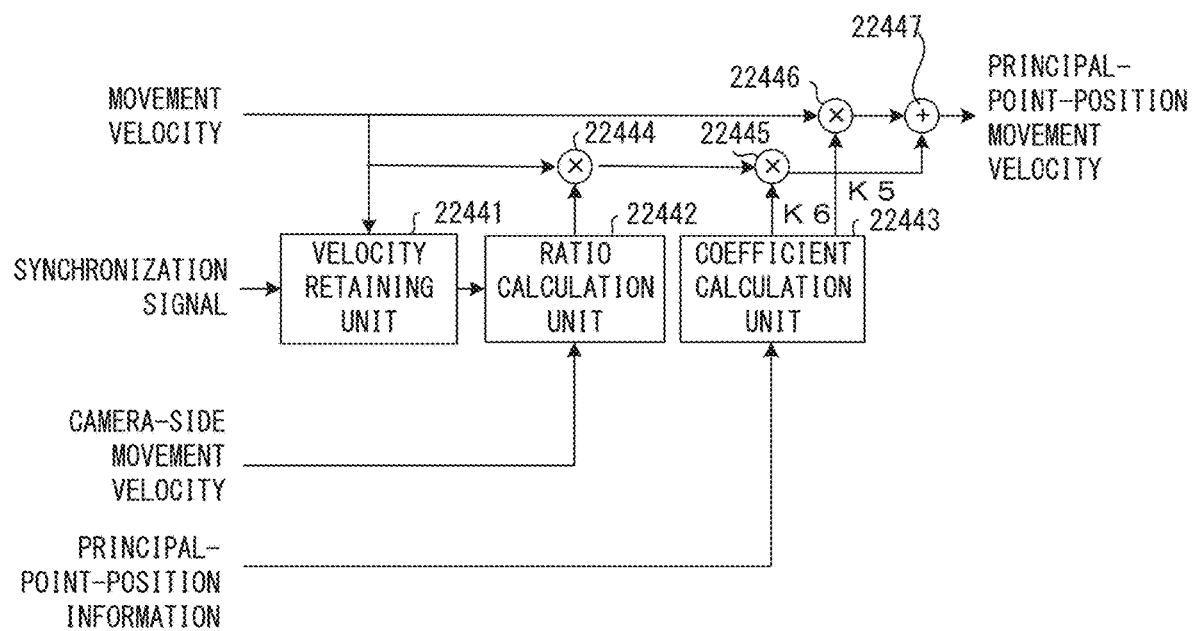
FIG. 16 illustrates an exemplary internal configuration of a velocity correction unit in accordance with a second embodiment.

FIG. 16 illustrates an exemplary internal configuration of the velocity correction unit 2244.

As depicted in FIG. 16, the velocity correction unit 2244 includes a velocity retaining unit 22441, a ratio calculation unit 22442, a coefficient calculation unit 22443, multiplication units 22444, 22445, and 22446, and an addition unit 22447.

The velocity retaining unit 22441 retains, in synchrony with a synchronization timing of a synchronization signal reported from the camera body 10, X-direction and Y-direction movement velocities calculated by the integration unit 2243 for the intersection point of the optical axis and the mounting plane P2.

The X-direction and Y-direction movement velocities calculated for the intersection point of the optical axis and the mounting plane P1 are reported from the camera body 10 to the ratio calculation unit 22442 via the communication unit 221. These movement velocities, which are calculated by the blurring correction microcomputer 14 in synchrony with the synchronization timing of a synchronization signal reported from the system controller 13, are periodically reported. For each of the X and Y directions, the ratio calculation unit 22442 calculates the ratio between the movement velocity calculated for the intersection point of the optical axis and the mounting plane P1 that has been reported from the camera body 10 and the movement velocity calculated for the intersection point of the optical axis and the mounting plane P2 that has been retained by the velocity retaining unit 22441 at the same synchronization timing as the former movement velocity.

The multiplication unit 22444 multiplies, for each of the X and Y directions, the movement velocity calculated by the integration unit 2243 for the intersection point of the optical axis and the mounting plane P2 by the ratio calculated by the ratio calculation unit 22442 so as to calculate the X-direction and Y-direction movement velocities for the intersection point of the optical axis and the mounting plane P1.

On the basis of formula (11) and information on the front principal-point position of the image shooting optical system (principal-point-position information), the coefficient calculation unit 22443 calculates coefficients K5 and K6 for calculating X-direction and Y-direction movement velocities for the front principal-point position. More specifically, coefficient K5 is calculated in accordance with K5=Lb/(Lb−La), and coefficient K6 is calculated in accordance with K6=−La/(Lb−La). As the front principal-point position is varied according to the settings of the image shooting optical system 21 such as magnification and focus, the coefficient calculation unit 22443 recalculates the coefficients every time a change is made to the settings. For example, information on the front principal-point position may be acquired by the lens control unit 222 and input to the velocity correction unit 2244 of the shift-blurring-amount calculation unit 224 via the communication unit 221. Distances La and Lb are calculated on the basis of information on the front principal-point position, information on the mounting positions of the acceleration sensors 15, and information on the mounting positions of the acceleration sensors 24. Information on the mounting positions of the acceleration sensors 15 is input from the blurring correction microcomputer 14 via the system controller 13 and the communication unit 221 to the velocity correction unit 2244 of the shift-blurring-amount calculation unit 224.

The multiplication unit 22446 multiplies each of the X-direction and Y-direction movement velocities calculated by the integration unit 2243 for the intersection point of the optical axis and the mounting plane P2 by the coefficient K5 calculated by the coefficient calculation unit 22443.

The multiplication unit 22445 multiplies each of the X-direction and Y-direction movement velocities calculated by the multiplication unit 22444 for the intersection point of the optical axis and the mounting plane P1 by the coefficient K6 calculated by the coefficient calculation unit 22443.

The addition unit 22447 sums, for each of the X and Y directions, the multiplication result provided by the multiplication unit 22445 and the multiplication result provided by the multiplication unit 22446 so as to calculate (estimate) X-direction and Y-direction movement velocities for the front principal-point position.

Figure 17:
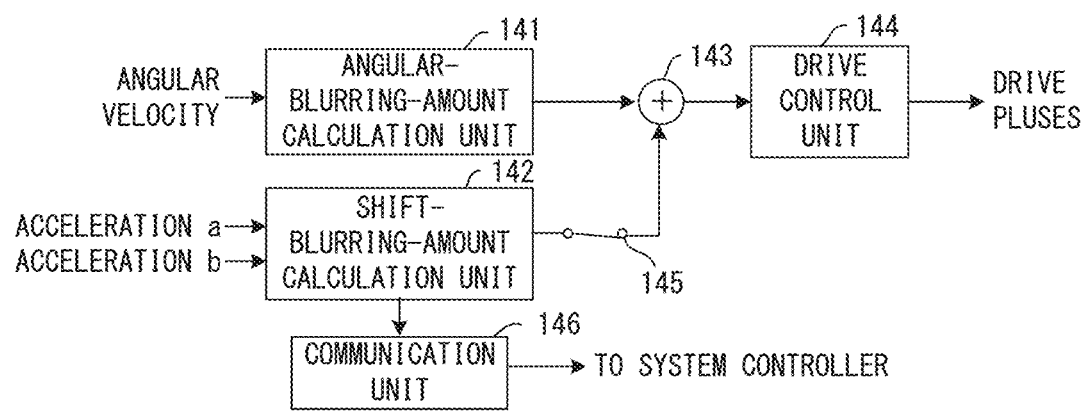
FIG. 17 illustrates an exemplary internal configuration of a blurring correction microcomputer in accordance with a second embodiment.

FIG. 17 illustrates an exemplary internal configuration of the blurring correction microcomputer 14.

As depicted in FIG. 17, the blurring correction microcomputer 14 includes an angular-blurring-amount calculation unit 141, a shift-blurring-amount calculation unit 142, an addition unit 143, a drive control unit 144, a switch 145, and a communication unit 146.

The angular-blurring-amount calculation unit 141 calculates, on the basis of an angular-velocity-detection result provided by the angular velocity sensor 16, X-direction and Y-direction image blurring amounts of image blurring that occurs on the imaging plane of the image pickup element 11 due to a rotational motion of the camera system 100 and calculates X-direction and Y-direction correction amounts (rotational-blurring correction amounts) to cancel out the image blurring amounts.

The shift-blurring-amount calculation unit 142 calculates, on the basis of a detection result provided by the acceleration sensor 15a (acceleration a) and a detection result provided by the acceleration sensor 15b (acceleration b), X-direction and Y-direction image blurring amounts of image blurring that occurs on the imaging plane of the image pickup element 11 due to translation of the camera system 100 and calculates X-direction and Y-direction correction amounts (shift-blurring correction amounts) to cancel out the image blurring amounts. The shift-blurring-amount calculation unit 142 retains the X-direction and Y-direction movement velocities calculated for the intersection point of the optical axis and the mounting plane P1 in the process of calculating the image blurring amounts. The internal configuration of the shift-blurring-amount calculation unit 142 will be described hereinafter by referring to FIG. 18.

For each of the X and Y directions, the addition unit 143 sums the correction amounts calculated by the angular-blurring-amount calculation unit 141 and the shift-blurring-amount calculation unit 142.

The drive control unit 144 converts the correction amounts summed for each of the X and Y directions by the addition unit 143 into drive pulses for driving the drive unit 12 and outputs the drive pluses to the drive unit 12. The drive unit 12 is driven in accordance with the drive pluses so as to move the image pickup element 11. Accordingly, the image pickup element 11 is moved to eliminate image blurring that occurs on the imaging plane of the image pickup element 11.

When the interchangeable lens 20 has a translational-blurring correction function, the switch 145 is turned off in accordance with an instruction from the system controller 13. When the switch 145 is turned off, the addition unit 143 does not perform the summing process, and the drive control unit 144 converts the X-direction and Y-direction correction amounts calculated for each of the X and Y directions by the angular-blurring-amount calculation unit 141 into drive pulses for driving the drive unit 12 and outputs the drive pluses to the drive unit 12. In this case, the translational-blurring correction based on the movement of the image pickup element 11 is not performed.

Under the control of the system controller 13, the communication unit 146 outputs, to the system controller 13, X-direction and Y-direction movement velocities retained by the shift-blurring-amount calculation unit 142 for the intersection point of the optical axis and the mounting plane P1. The system controller 13 reports these movement velocities to the LCU 22 via a mount.

Figure 18:
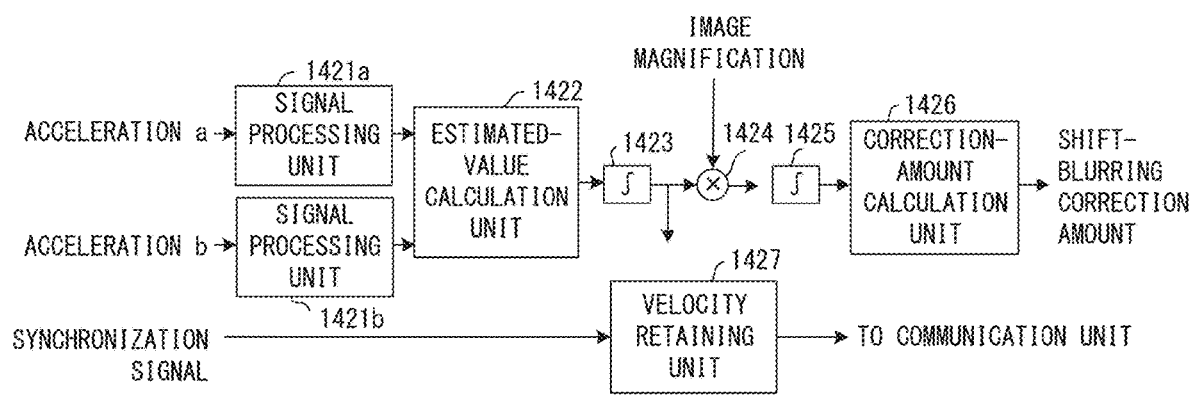
FIG. 18 illustrates an exemplary internal configuration of a shift-blurring-amount calculation unit within a blurring correction microcomputer in accordance with a second embodiment.

FIG. 18 illustrates an exemplary internal configuration of the shift-blurring-amount calculation unit 142.

As depicted in FIG. 18, the shift-blurring-amount calculation unit 142 includes two signal processing units 1421 (1421a, 1421b), an estimated-value calculation unit 1422, an integration unit 1423, a multiplication unit 1424, an integration unit 1425, a correction-amount calculation unit 1426, and a velocity retaining unit 1427. The signal processing units 1421 each apply, for example, processing for removing gravitational components and filter processing to X-direction and Y-direction accelerations that have been input thereto. Accordingly, the X-direction and Y-direction accelerations that have been input are converted into a value of 0 when the camera is in a stationary state and otherwise each into a digital value, wherein the absolute value of the digital value indicates the magnitude of the acceleration, and the sign of the digital value indicates the direction of the acceleration. In the present embodiment, X-direction and Y-direction accelerations a detected by the acceleration sensor 15a are input to, and then processed by, the signal processing unit 1421a, and X-direction and Y-direction accelerations b detected by the acceleration sensor 15b are input to, and then processed by, the signal processing unit 1421b.

In accordance with the ratio between the distances from the optical axis to the individual mounting positions of the acceleration sensors 15, the estimated-value calculation unit 2242 calculates X-direction and Y-direction acceleration estimated values for the intersection point of the optical axis and the mounting plane P1 on the basis of formulae (5) and (6) (or formulae (7) and (8)).

The integration unit 1423 integrates, with respect to time, X-direction and Y-direction acceleration estimated values calculated by the estimated-value calculation unit 1422 so as to calculate X-direction and Y-direction movement velocities for the intersection point of the optical axis and the mounting plane P1.

The multiplication unit 1424 multiplies each of the X-direction and Y-direction movement velocities calculated by the integration unit 1423 by an image magnification of the image shooting optical system 21 so as to convert these velocities into the velocities of the image movements in the X direction and the Y direction on the imaging plane of the image pickup element 11.

The integration unit 1425 integrates, with respect to time, the velocities of the image movements in the X direction and the Y direction on the imaging plane, i.e., the multiplication results provided by the multiplication unit 1424, so as to calculate the amounts of the image movements in the X direction and the Y direction on the imaging plane (image blurring amounts).

The correction-amount calculation unit 1426 calculates X-direction and Y-direction correction amounts (shift-blurring correction amounts) for canceling out the X-direction and Y-direction image blurring amounts calculated by the integration unit 1425.

In synchrony with the synchronization timing of a synchronization signal reported from the system controller 13, the velocity retaining unit 1427 retains the X-direction and Y-direction movement velocities calculated by the integration unit 1423 for the intersection point of the optical axis and the mounting plane P1. The system controller 13 periodically reads the retained movement velocities via the communication unit 146.

As described above, the present embodiment allows accelerations to be calculated (estimated) for the front principal-point position of the image shooting optical system 21 even when an acceleration sensor cannot be disposed in the vicinity of the front principal-point position due to limitations in the configuration of the interchangeable lens 20. Accordingly, shift blurring can be accurately corrected by making blur corrections on the basis of the accelerations.

The following describes a variation of the present embodiment by referring to FIGS. 19-26.

Figure 19:
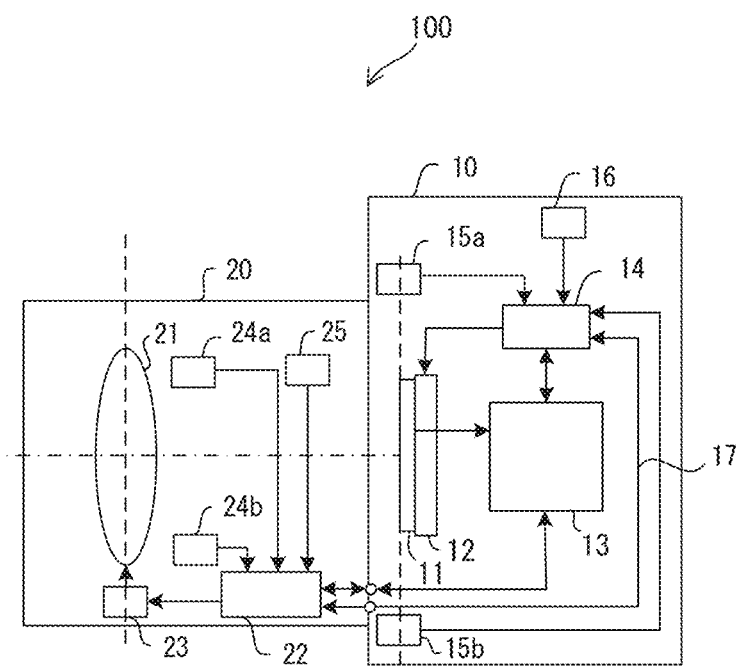
FIG. 19 illustrates an exemplary configuration of a camera system in accordance with a variation of a second embodiment.
Figure 21:
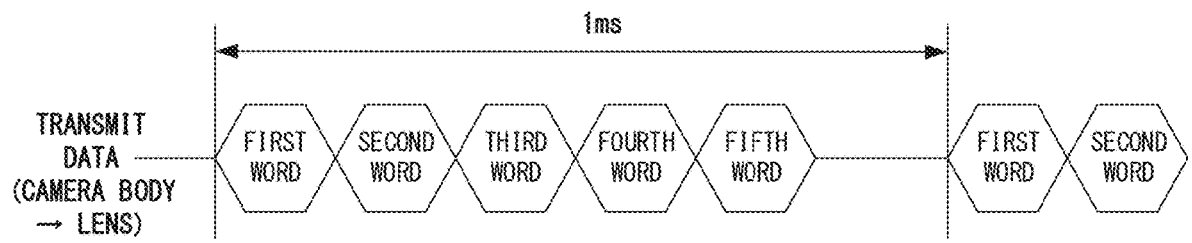
FIG. 21 illustrates a timing chart for transmit data.

FIG. 19 illustrates an exemplary configuration of the camera system 100 in accordance with this variation. FIG. 20 illustrates an exemplary format of transmit data. FIG. 21 illustrates a timing chart for transmit data.

The camera system 100 in accordance with this variation further includes, as depicted in FIG. 19, a communication path 17 connecting between the blurring correction microcomputer 14 and the LCU 22 via a mount, so that the blurring correction microcomputer 14 and the LCU 22 can perform a fast communication directly with each other. For example, a communication may be performed via the communication path 17 by using a communication scheme such as low voltage differential signaling (LDVS). Accordingly, the blurring correction microcomputer 14 and the LCU 22 can communicate with each other at a higher speed than the communication between the system controller 13 and the LCU 22. In this variation, Yaw-direction, Pitch-direction, and Roll-direction angular velocities detected by the angular velocity sensor 16 and X-direction and Y-direction acceleration estimated values calculated within the blurring correction microcomputer 14 are transmitted from the blurring correction microcomputer 14 to the LCU 22 via the communication path 17 in real time. In this case, for example, the Yaw-direction, Pitch-direction, and Roll-direction angular velocities and the X-direction and Y-direction acceleration estimated values may be transmitted every millisecond at the timing depicted in FIG. 21 in accordance with the format depicted in FIG. 20. In this situation, data of 80 bits (16 bits×5) is transmitted on a cycle of 1 ms, and hence a communication rate of 80000 bps or higher may be sufficient for the processing.

Figure 22:
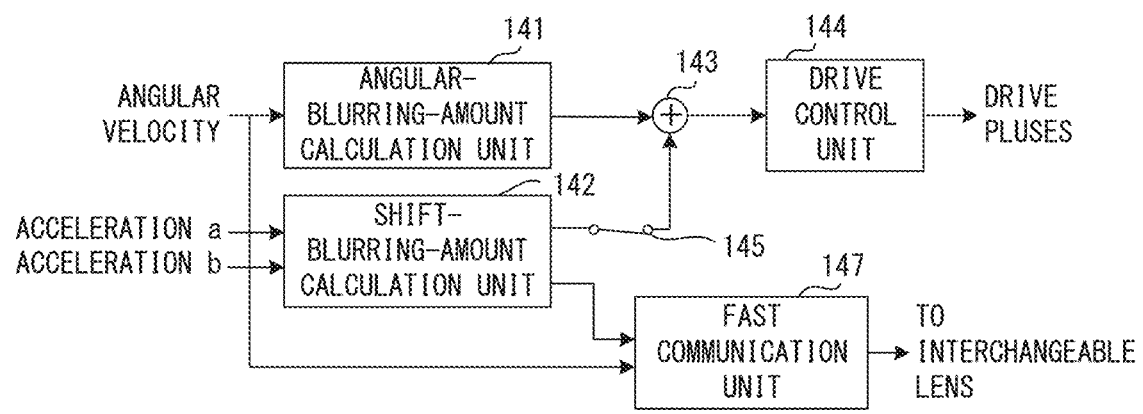
FIG. 22 illustrates an exemplary internal configuration of a blurring correction microcomputer in accordance with a variation of a second embodiment.

FIG. 22 illustrates an exemplary internal configuration of the blurring correction microcomputer 14 in accordance with this variation.

The blurring correction microcomputer 14 in accordance with this variation is different from the blurring correction microcomputer 14 depicted in FIG. 17 in that the former blurring correction microcomputer 14 further includes a fast communication unit 147, as depicted in FIG. 22. In view of this, the blurring correction microcomputer 14 in accordance with this variation does not include the communication unit 146 depicted in FIG. 17.

The fast communication unit 147 transmits Yaw-direction, Pitch-direction, and Roll-direction angular velocities detected by the angular velocity sensor 16 and X-direction and Y-direction acceleration estimated values calculated by the shift-blurring-amount calculation unit 142 to the LCU 22 through the communication path 17 that extends via the mount. For example, this transmission may be made every millisecond at the timing depicted in FIG. 21 in accordance with the format depicted in FIG. 20.

Figure 23:
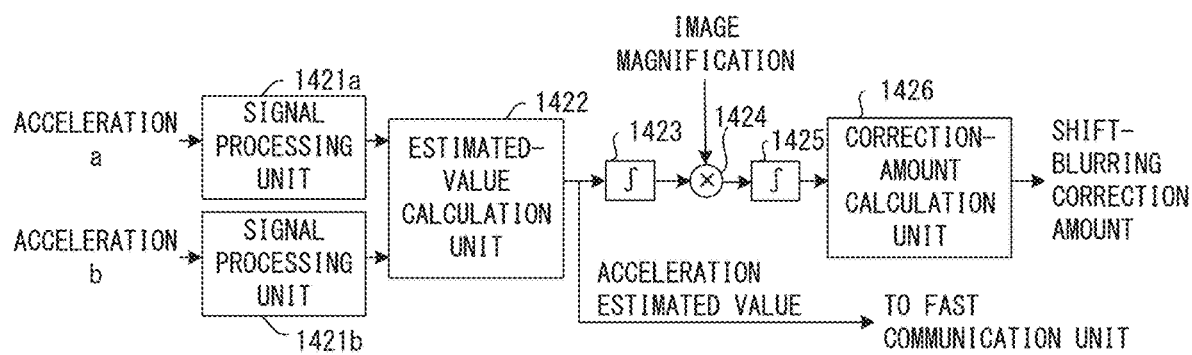
FIG. 23 illustrates an exemplary internal configuration of a shift-blurring-amount calculation unit within a blurring correction microcomputer in accordance with a variation of a second embodiment.

FIG. 23 illustrates an exemplary internal configuration of the shift-blurring-amount calculation unit 142 in accordance with this variation.

The shift-blurring-amount calculation unit 142 in accordance with this variation is different from the shift-blurring-amount calculation unit 142 depicted in FIG. 18 in that X-direction and Y-direction acceleration estimated values calculated (estimated) by the estimated-value calculation unit 1422 of the former shift-blurring-amount calculation unit 142 are also output to the fast communication unit 147, as depicted in FIG. 23. In view of this, the shift-blurring-amount calculation unit 142 in accordance with this variation does not retain X-direction and Y-direction movement velocities calculated by the integration unit 1423 and does not include the velocity retaining unit 1427 depicted in FIG. 18.

Figure 24:
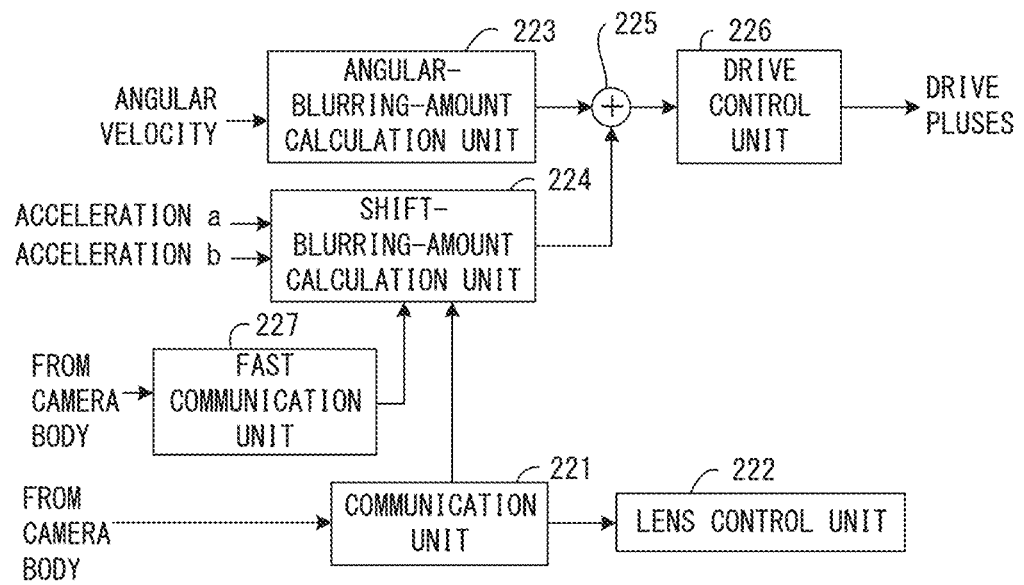
FIG. 24 illustrates an exemplary internal configuration of an LCU in accordance with a variation of a second embodiment.

FIG. 24 illustrates an exemplary internal configuration of the LCU 22 in accordance with this variation.

The LCU 22 in accordance with this variation is different from the LCU 22 depicted in FIG. 14 in that the former LCU 22 further includes a fast communication unit 227, as depicted in FIG. 24. The fast communication unit 227 receives Yaw-direction, Pitch-direction, and Roll-direction angular velocities and X-direction and Y-direction estimated acceleration values that are transmitted every millisecond from the blurring correction microcomputer 14 and reports the X-direction and Y-direction estimated acceleration values among these received values to the shift-blurring-amount calculation unit 224.

Figure 25:
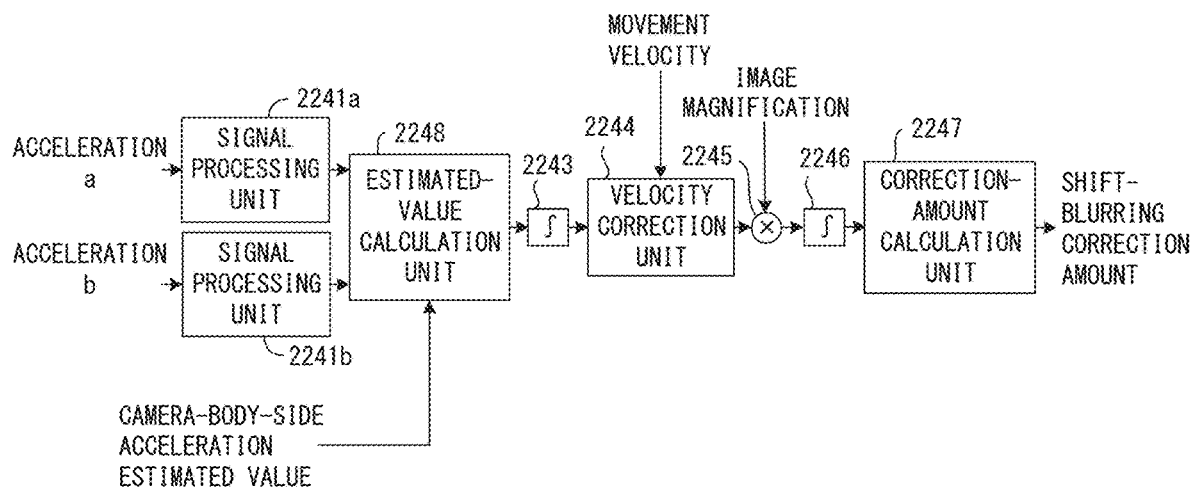
FIG. 25 illustrates an exemplary internal configuration of a shift-blurring-amount calculation unit within an LCU in accordance with a variation of a second embodiment.

FIG. 25 illustrates an exemplary internal configuration of the shift-blurring-amount calculation unit 224 in accordance with this variation.

The shift-blurring-amount calculation unit 224 in accordance with this variation is different from the shift-blurring-amount calculation unit 224 depicted in FIG. 15 in that the former shift-blurring-amount calculation unit 224 includes an estimated-value calculation unit 2248 as depicted in FIG. 25, in place of the estimated-value calculation unit 2242 of the latter shift-blurring-amount calculation unit 224, wherein the estimated-value calculation unit 2248 has an internal configuration different from that of the estimated-value calculation unit 2242 of the shift-blurring-amount calculation unit 224 depicted in FIG. 15 and has further input thereto X-direction and Y-direction estimated acceleration values reported from the fast communication unit 227.

Figure 26:
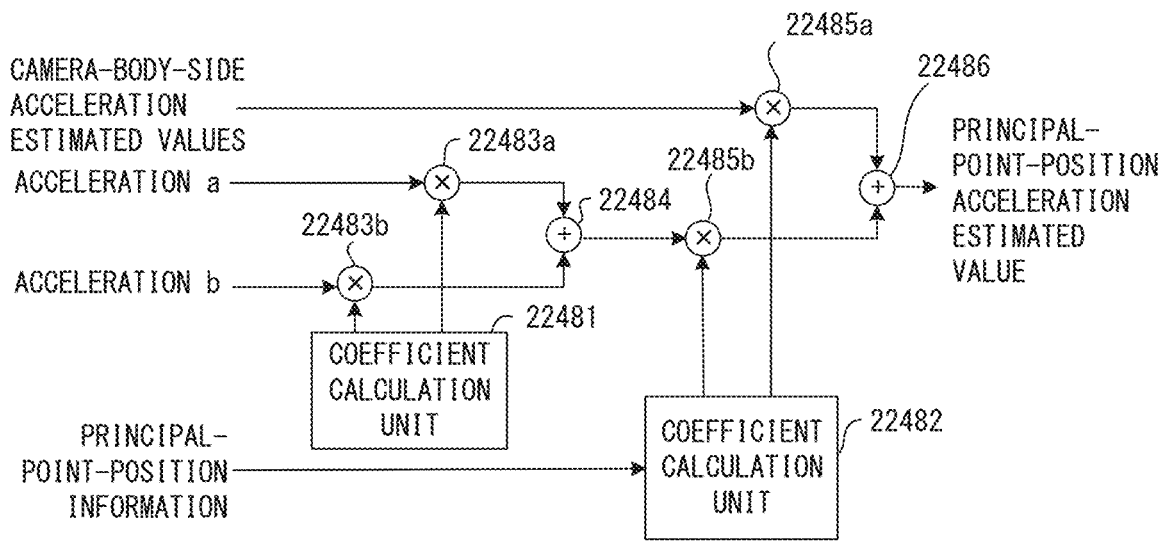
FIG. 26 illustrates an exemplary internal configuration of an estimated-value calculation unit within an LCU in accordance with a variation of a second embodiment.

FIG. 26 illustrates an exemplary internal configuration of the estimated-value calculation unit 2248 in accordance with this variation.

As depicted in FIG. 26, the estimated-value calculation unit 2248 in accordance with this variation includes coefficient calculation units 22481 and 22482, multiplication units 22483a and 22483b, an addition unit 22484, multiplication units 22485a and 22485b, and an addition unit 22486.

In accordance with the ratio between the distances from the optical axis to the individual mounting positions of the acceleration sensors 24, the coefficient calculation unit 22481, the multiplication units 22483a and 22483b, and the addition unit 22484 calculate X-direction and Y-direction acceleration estimated values for the intersection point of the optical axis and the mounting plane P2 on the basis of formulae (5) and (6) (or formulae (7) and (8)).

More particularly, the coefficient calculation unit 22481 calculates four coefficients that correspond to the above-mentioned coefficients K1, K2, K3, and K4. These four coefficients are fixed values that depend on the mounting positions of the two acceleration sensors 24. In this variation, all of the coefficients are ½ since the two acceleration sensors 24 also face each other with the optical axis as the center point therebetween. The multiplication unit 22483a multiplies X-direction and Y-direction accelerations a after the processing performed by the signal processing unit 2241a by the coefficient that corresponds to K1 and the coefficient that corresponds to K3. The multiplication unit 22483b multiplies X-direction and Y-direction accelerations b after the processing performed by the signal processing unit 2241b by the coefficient that corresponds to K2 and the coefficient that corresponds to K4. The addition unit 22484 sums, for each of the X and Y directions, the multiplication result provided by the multiplication unit 22483a and the multiplication result provided by the multiplication unit 22483b so as to calculate X-direction and Y-direction acceleration estimated values.

The coefficient calculation unit 22482, the multiplication units 22485a and 22485b, and the addition unit 22486 calculate X-direction and Y-direction acceleration estimated values for the front principal-point position on the basis of formula (11) in accordance with information on the front principal-point position, the X-direction and Y-direction acceleration estimated values reported from the fast communication unit 227 for the intersection point of the optical axis and the mounting plane P1, and the X-direction and Y-direction acceleration estimated values calculated for the intersection point of the optical axis and the mounting plane P2, i.e., the calculation results provided by the addition unit 22484.

More specifically, as with the coefficient calculation unit 22443, the coefficient calculation unit 22482 calculates coefficients K5 and K6. The multiplication unit 22485a multiplies, by coefficient K6, each of the X-direction and Y-direction acceleration estimated values reported from the fast communication unit 227 for the intersection point of the optical axis and the mounting plane P1. The multiplication unit 22485b multiplies, by coefficient K5, each of the X-direction and Y-direction acceleration estimated values calculated for the intersection point of the optical axis and the mounting plane P2, i.e., the calculation results provided by the addition unit 22484. The addition unit 22486 sums, for each of the X and Y directions, the multiplication result provided by the multiplication unit 22485a and the multiplication result provided by the multiplication unit 22485b so as to calculate X-direction and Y-direction acceleration estimated values for the front principal-point position.

The acceleration estimated values to be reported from the camera body 10 are detected (calculated) on a cycle of 1 ms and transmitted in real time. Hence, the timing at which acceleration estimated values to be reported from the camera body 10 are detected (calculated) and the timing at which acceleration estimated values are detected (calculated) by the addition unit 22486 have a difference of 1 ms or shorter therebetween.

In this variation, the communication path 17 is provided between the LCU 22 and the blurring correction microcomputer 14 so that accelerations can be calculated (estimated) for the front principal-point position in real time, thereby improving the accuracy in acceleration estimation. In this embodiment, as described above with reference to the estimated-value calculation units 2242 or 2248 and the integration unit 2243, accelerations are first calculated (estimated), and movement velocities are then calculated on the basis of these accelerations. However, the calculation of movement velocities is not limited to this. For example, movement velocities may first be calculated for the mounting positions of the acceleration sensors, and on the basis of these movement velocities, movement velocities may then be calculated (estimated) for the intersection point of the mounting plane of each acceleration sensor and the optical axis.

The described embodiments provide the advantageous effect that accelerations or movement velocities can be accurately detected for the front principal-point position of the image shooting optical system, thereby allowing image blurring that could be caused by translation to be accurately corrected.

The described embodiments are not simply limited to the first embodiment, the variation thereof, the second embodiment, and the variation thereof, and the components of the embodiments may be varied in an implementation phase without departing from the gist of the invention. A plurality of components disclosed with reference to the described embodiments may be combined, as appropriate, to provide various embodiments. For example, some of the components indicated with reference to an embodiment may be omitted. In addition, components of different embodiments may be combined, as appropriate.

What is claimed is:

1. An imaging apparatus, that includes an image shooting optical system for forming an image of a subject, the imaging apparatus comprising:
   a first acceleration sensor that detects accelerations for first and second directions;
   a second acceleration sensor that detects accelerations for the first and second directions, the first and second acceleration sensors being located at different positions on a first plane orthogonal to an optical axis of the image shooting optical system; and
   a first microprocessor that includes the following sections for performing arithmetic processing:
      a first acceleration estimation section that calculates a first-direction acceleration estimated value for a first position on the optical axis on the basis of a distance in the second direction between the optical axis and the first acceleration sensor, a distance in the second direction between the optical axis and the second acceleration sensor, a first-direction acceleration detected value provided by the first acceleration sensor, and a first-direction acceleration detected value provided by the second acceleration sensor,
      a second acceleration estimation section that calculates a second-direction acceleration estimated value for the first position on the basis of a distance in the first direction between the optical axis and the first acceleration sensor, a distance in the first direction between the optical axis and the second acceleration sensor, a second-direction acceleration detected value provided by the first acceleration sensor, and a second-direction acceleration detected value provided by the second acceleration sensor, and
      a blurring amount calculation section that calculates a first-direction image blurring amount and a second-direction image blurring amount for the imaging apparatus by using the first-direction acceleration estimated value and the second-direction acceleration estimated value, wherein
   the first and second acceleration sensors are positioned in a manner such that the optical axis is positioned at a midpoint between the first and second acceleration sensors,
   the first acceleration estimation section defines, as a first-direction acceleration estimated value, an average of the first-direction acceleration detected value provided by the first acceleration sensor and the first-direction acceleration detected value provided by the second acceleration sensor, and
   the second acceleration estimation section defines, as a second-direction acceleration estimated value, an average of the second-direction acceleration detected value provided by the first acceleration sensor and the second-direction acceleration detected value provided by the second acceleration sensor.

2. The imaging apparatus of claim 1, further comprising:
   a third acceleration sensor that detects accelerations for the first and second directions; and
   a fourth acceleration sensor that detects accelerations for the first and second directions, the third and fourth acceleration sensors being located at different positions on a second plane orthogonal to the optical axis, wherein
   the first microprocessor further includes the following sections for performing arithmetic processing,
      a third acceleration estimation section that calculates a first-direction acceleration estimated value for a second position on the optical axis on the basis of a distance in the second direction between the optical axis and the third acceleration sensor, a distance in the second direction between the optical axis and the fourth acceleration sensor, a first-direction acceleration detected value provided by the third acceleration sensor, and a first-direction acceleration detected value provided by the fourth acceleration sensor, a fourth acceleration estimation section that calculates a second-direction acceleration estimated value for the second position on the basis of a distance in the first direction between the optical axis and the third acceleration sensor, a distance in the first direction between the optical axis and the fourth acceleration sensor, a second-direction acceleration detected value provided by the third acceleration sensor, and a second-direction acceleration detected value provided by the fourth acceleration sensor, a fifth acceleration estimation section that calculates a first-direction acceleration estimated value for a principal-point position on the optical axis of the image shooting optical system on the basis of the first-direction acceleration estimated value calculated for the first position by the first acceleration estimation section, the first-direction acceleration estimated value calculated for the second position by the third acceleration estimation section, a distance between the principal-point position and the first position, and a distance between the principal-point position and the second position, and a sixth acceleration estimation section that calculates a second-direction acceleration estimated value for a principal-point position on the basis of the second-direction acceleration estimated value calculated for the first position by the second acceleration estimation section, the second-direction acceleration estimated value calculated for the second position by the fourth acceleration estimation section, a distance between the principal-point position and the first position, and a distance between the principal-point position and the second position, wherein the blurring calculation section further calculates a first-direction image blurring amount and a second-direction image blurring amount for the imaging apparatus by using the first-direction acceleration estimated value calculated for the principal-point position and the second-direction acceleration estimated value calculated for the principal-point position.

3. An imaging apparatus that includes an image shooting optical system for forming an image of a subject, the imaging apparatus comprising:

a first acceleration sensor that detects accelerations for first and second directions;

a second acceleration sensor that detects accelerations for the first and second directions, the first and second acceleration sensors being located at different positions on a first plane orthogonal to an optical axis of the image shooting optical system;

a third acceleration sensor that detects accelerations for the first and second directions;

a fourth acceleration sensor that detects accelerations for the first and second directions, the third and fourth acceleration sensors being located at different positions on a second plane orthogonal to the optical axis, and a first microprocessor that includes the following sections for performing arithmetic processing:

a first acceleration estimation section that calculates a first-direction acceleration estimated value for a first position on the optical axis on the basis of a distance in the second direction between the optical axis and the first acceleration sensor, a distance in the second direction between the optical axis and the second acceleration sensor, a first-direction acceleration detected value provided by the first acceleration sensor, and a first-direction acceleration detected value provided by the second acceleration sensor, a second acceleration estimation section that calculates a second-direction acceleration estimated value for the first position on the basis of a distance in the first direction between the optical axis and the first acceleration sensor, a distance in the first direction between the optical axis and the second acceleration sensor, a second-direction acceleration detected value provided by the first acceleration sensor, and a second-direction acceleration detected value provided by the second acceleration sensor, a blurring amount calculation section that calculates a first-direction image blurring amount and a second-direction image blurring amount for the imaging apparatus by using the first-direction acceleration estimated value and the second-direction acceleration estimated value, a third acceleration estimation section that calculates a first-direction acceleration estimated value for a second position on the optical axis on the basis of a distance in the second direction between the optical axis and the third acceleration sensor, a distance in the second direction between the optical axis and the fourth acceleration sensor, a first-direction acceleration detected value provided by the third acceleration sensor, and a first-direction acceleration detected value provided by the fourth acceleration sensor, a fourth acceleration estimation section that calculates a second-direction acceleration estimated value for the second position on the basis of a distance in the first direction between the optical axis and the third acceleration sensor, a distance in the first direction between the optical axis and the fourth acceleration sensor, a second-direction acceleration detected value provided by the third acceleration sensor, and a second-direction acceleration detected value provided by the fourth acceleration sensor, a fifth acceleration estimation section that calculates a first-direction acceleration estimated value for a principal-point position on the optical axis of the image shooting optical system on the basis of the first-direction acceleration estimated value calculated for the first position by the first acceleration estimation section, the first-direction acceleration estimated value calculated for the second position by the third acceleration estimation section, a distance between the principal-point position and the first position, and a distance between the principal-point position and the second position, and a sixth acceleration estimation section that calculates a second-direction acceleration estimated value for a principal-point position on the basis of the second-direction acceleration estimated value calculated for the first position by the second acceleration estimation section, the second-direction acceleration estimated value calculated for the second position by the fourth acceleration estimation section, a distance between the principal-point position and the first position, and a distance between the principal-point position and the second position, wherein the blurring calculation section further calculates a first-direction image blurring amount and a second-direction image blurring amount for the imaging apparatus by using the first-direction acceleration estimated value calculated for the principal-point position and the second-direction acceleration estimated value calculated for the principal-point position.

4. The imaging apparatus of claim 3, wherein
the imaging apparatus is a camera system that includes a camera body provided with an image pickup element and an interchangeable lens provided with the image shooting optical system,
the interchangeable lens is capable of being attached to and detached from the camera body,
the first position is an imaging center position on an imaging plane of the image pickup element, and
the second position is an arbitrary position on the optical axis that is located within the interchangeable lens.

5. The imaging apparatus of claim 4, wherein
the interchangeable lens includes
   a first lens communication circuit that transmits/receives data to/from the camera body, and
   a second lens communication circuit that transmits/receives data to/from the camera body at a speed higher than the first lens communication circuit,
the camera body includes
   a first camera communication circuit that transmits/receives data to/from the interchangeable lens, and
   a second camera communication circuit that transmits/receives data to/from the interchangeable lens at a speed higher than the first camera communication circuit, and
the second camera communication circuit transmits, to the second lens communication circuit, estimated acceleration detected values calculated for the first position on the basis of individual acceleration detected values provided by the first and second acceleration sensors of the camera body.

6. An imaging apparatus that includes an image shooting optical system for forming an image of a subject, the imaging apparatus comprising:
   a first acceleration sensor that detects accelerations for first and second directions;
   a second acceleration sensor that detects accelerations for the first and second directions, the first and second acceleration sensors being located at different positions on a first plane orthogonal to an optical axis of the image shooting optical system;
   a first microprocessor that includes the following sections for performing arithmetic processing:
      a first acceleration estimation section that calculates a first-direction acceleration estimated value for a first position on the optical axis on the basis of a distance in the second direction between the optical axis and the first acceleration sensor, a distance in the second direction between the optical axis and the second acceleration sensor, a first-direction acceleration detected value provided by the first acceleration sensor, and a first-direction acceleration detected value provided by the second acceleration sensor,
      a second acceleration estimation section that calculates a second-direction acceleration estimated value for the first position on the basis of a distance in the first direction between the optical axis and the first acceleration sensor, a distance in the first direction between the optical axis and the second acceleration sensor, a second-direction acceleration detected value provided by the first acceleration sensor, and a second-direction acceleration detected value provided by the second acceleration sensor, and
      a blurring amount calculation section that calculates a first-direction image blurring amount and a second-direction image blurring amount for the imaging apparatus by using the first-direction acceleration estimated value and the second-direction acceleration estimated value;
   an image pickup element; and
   a second microprocessor that includes the following sections for performing arithmetic processing:
      a focused-on-position detection section that detects a focused-on position on an imaging plane of the image pickup element that is provided when the image shooting optical system is adjusted by a focus adjustment mechanism, wherein
the first acceleration estimation section further calculates a first-direction acceleration estimated value for the focused-on position on the basis of a distance in the second direction between the focused-on position and the first acceleration sensor, a distance in the second direction between the focused-on position and the second acceleration sensor, the first-direction acceleration detected value provided by the first acceleration sensor, and the first-direction acceleration detected value provided by the second acceleration sensor,
the second acceleration estimation section further calculates a second-direction acceleration estimated value for the focused-on position on the basis of a distance in the first direction between the focused-on position and the first acceleration sensor, a distance in the first direction between the focused-on position and the second acceleration sensor, the second-direction acceleration detected value provided by the first acceleration sensor, and the second-direction acceleration detected value provided by the second acceleration sensor, and
the blurring amount calculation section further calculates a first-direction image blurring amount and the second-direction image blurring amount for the imaging apparatus by using the first-direction acceleration estimated value calculated for the focused-on position and the second-direction acceleration estimated value calculated for the focused-on position.

7. The imaging apparatus of claim 2, wherein
the imaging apparatus is a camera system that includes a camera body provided with an image pickup element and an interchangeable lens provided with the image shooting optical system,
the interchangeable lens is capable of being attached to and detached from the camera body,
the first position is an imaging center position on an imaging plane of the image pickup element, and
the second position is an arbitrary position on the optical axis that is located within the interchangeable lens.

8. The imaging apparatus of claim 7, wherein
the interchangeable lens includes
   a first lens communication circuit that transmits/receives data to/from the camera body, and
   a second lens communication circuit that transmits/receives data to/from the camera body at a speed higher than the first lens communication circuit,
the camera body includes
   a first camera communication circuit that transmits/receives data to/from the interchangeable lens, and
   a second camera communication circuit that transmits/receives data to/from the interchangeable lens at a speed higher than the first camera communication circuit, and the second camera communication circuit transmits, to the second lens communication circuit, estimated acceleration detected values calculated for the first position on the basis of individual acceleration detected values provided by the first and second acceleration sensors of the camera body.

9. An image blurring amount calculation method for an imaging apparatus that includes an image shooting optical system for forming an image of a subject and first and second acceleration sensors disposed at different positions on a plane orthogonal to an optical axis of the image shooting optical system, the image blurring amount calculation method comprising:

detecting, by the first acceleration sensor, a first-direction acceleration and a second-direction acceleration;

detecting, by the second acceleration sensor, the first-direction acceleration and the second-direction acceleration;

calculating a first-direction acceleration estimated value for a first position on the optical axis on the basis of a distance in the second direction between the optical axis and the first acceleration sensor, a distance in the second direction between the optical axis and the second acceleration sensor, a first-direction acceleration detected value provided by the first acceleration sensor, and a first-direction acceleration detected value provided by the second acceleration sensor;

calculating a second-direction acceleration estimated value for the first position on the basis of a distance in the first direction between the optical axis and the first acceleration sensor, a distance in the first direction between the optical axis and the second acceleration sensor, a second-direction acceleration detected value provided by the first acceleration sensor, and a second-direction acceleration detected value provided by the second acceleration sensor;

calculating a first-direction image blurring amount and a second-direction image blurring amount for the imaging apparatus by using the first-direction acceleration estimated value and the second-direction acceleration estimated value;

positioning the first and second acceleration sensors in a manner such that the optical axis is positioned at a midpoint between the first and second acceleration sensors, defining, as a first-direction acceleration estimated value, an average of the first-direction acceleration detected value provided by the first acceleration sensor and the first-direction acceleration detected value provided by the second acceleration sensor, and defining, as a second-direction acceleration estimated value, an average of the second-direction acceleration detected value provided by the first acceleration sensor and the second-direction acceleration detected value provided by the second acceleration sensor.

* * * * *